(12) United States Patent
Sato

(10) Patent No.: US 8,873,184 B2
(45) Date of Patent: Oct. 28, 2014

(54) TAPE DRIVE DEVICE, TAPE LIBRARY DEVICE, AND DATA STORING METHOD

(75) Inventor: Junichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 43 days.

(21) Appl. No.: 13/528,892

(22) Filed: Jun. 21, 2012

(65) Prior Publication Data

US 2013/0044386 A1 Feb. 21, 2013

(30) Foreign Application Priority Data

Aug. 16, 2011 (JP) ................. 2011-178102

(51) Int. Cl.
*G11B 5/008* (2006.01)
*G11B 20/10* (2006.01)
*G11B 15/02* (2006.01)
*G11B 23/04* (2006.01)
*G11B 15/68* (2006.01)

(52) U.S. Cl.
CPC ...... *G11B 20/10* (2013.01); *G11B 2020/10981* (2013.01); *G11B 2220/90* (2013.01); *G11B 15/02* (2013.01); *G11B 23/042* (2013.01); *G11B 2220/60* (2013.01); *G11B 2220/45* (2013.01); *G11B 15/689* (2013.01)
USPC .................. 360/55; 360/90; 360/134; 360/31

(58) Field of Classification Search
CPC ...... G11B 5/008; G11B 5/00813; G11B 5/78; G11B 15/005; G11B 21/027; G11B 2220/45; G11B 2220/60; G11B 2220/90
USPC ........... 360/55, 83, 90, 221, 241, 134, 78.07, 360/15, 31
See application file for complete search history.

(56) References Cited

U.S. PATENT DOCUMENTS

| | | | |
|---|---|---|---|
| 5,633,764 A * | 5/1997 | Ohta | 360/7 |
| 6,571,304 B1 * | 5/2003 | Basham et al. | 710/53 |
| 6,621,650 B1 * | 9/2003 | Takayama | 360/69 |
| 6,947,237 B2 | 9/2005 | Christie | |
| 7,898,760 B2 * | 3/2011 | Biskeborn | 360/65 |
| 7,929,236 B2 * | 4/2011 | Katagiri et al. | 360/48 |
| 2003/0067701 A1 * | 4/2003 | Christie, Jr. | 360/60 |
| 2009/0106510 A1 * | 4/2009 | Fujihara et al. | 711/154 |

FOREIGN PATENT DOCUMENTS

| | | |
|---|---|---|
| JP | 60-32177 | 2/1985 |
| JP | 11-316987 | 11/1999 |
| JP | 2003-123342 | 4/2003 |

* cited by examiner

*Primary Examiner* — Thomas Alunkal
(74) *Attorney, Agent, or Firm* — Fujitsu Patent Center

(57) ABSTRACT

A tape drive device for storing data in a tape cartridge includes a comparison unit that compares a transfer speed of the data transmitted from a host machine to the tape drive device with a speed threshold, a speed determination unit that determines a writing speed to a tape cartridge using the speed threshold, and a data write unit that writes data to the tape cartridge, the data write unit writing data to the magnetic tape provided for the tape cartridge when the determined writing speed is higher than the speed threshold, and the data write unit writing subsequent data following data written to the magnetic tape to the non-volatile semiconductor memory provided for the tape cartridge when the determined writing speed is lower than the speed threshold.

11 Claims, 7 Drawing Sheets

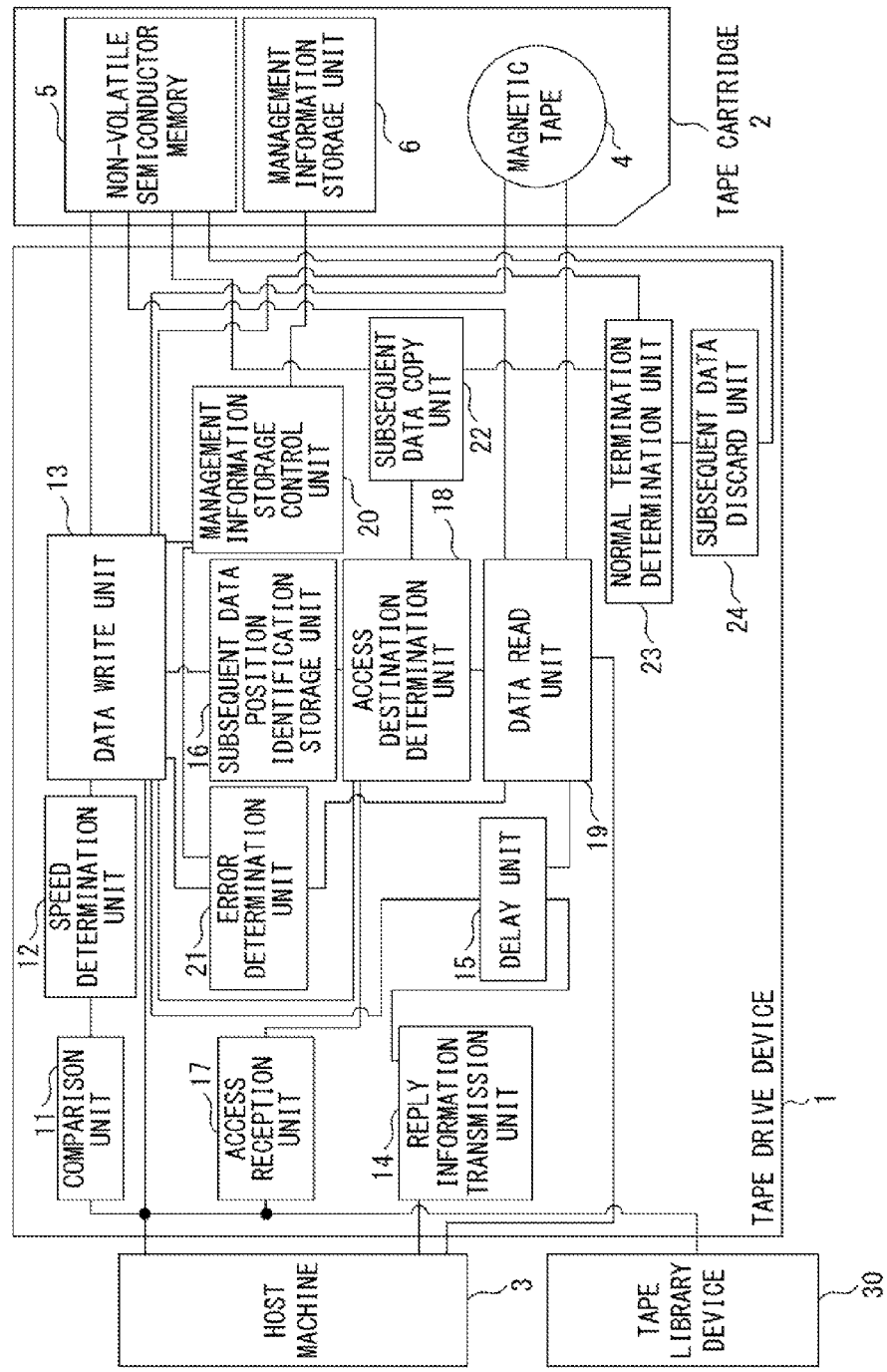
F I G. 1

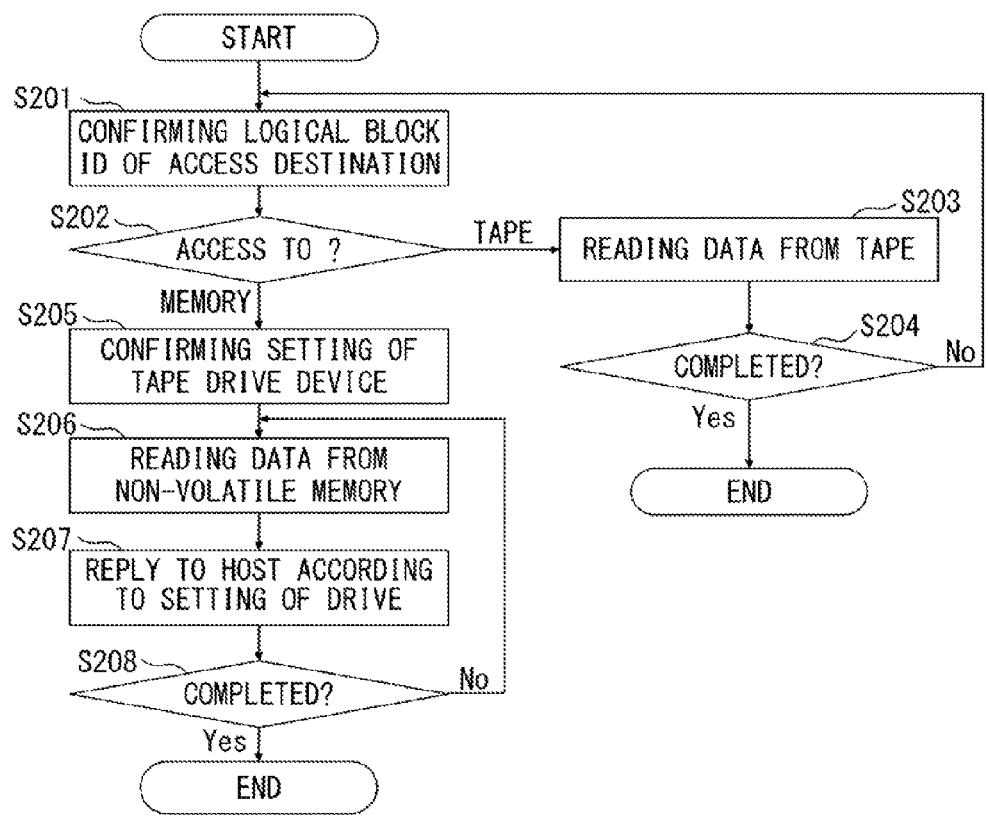
F I G. 5

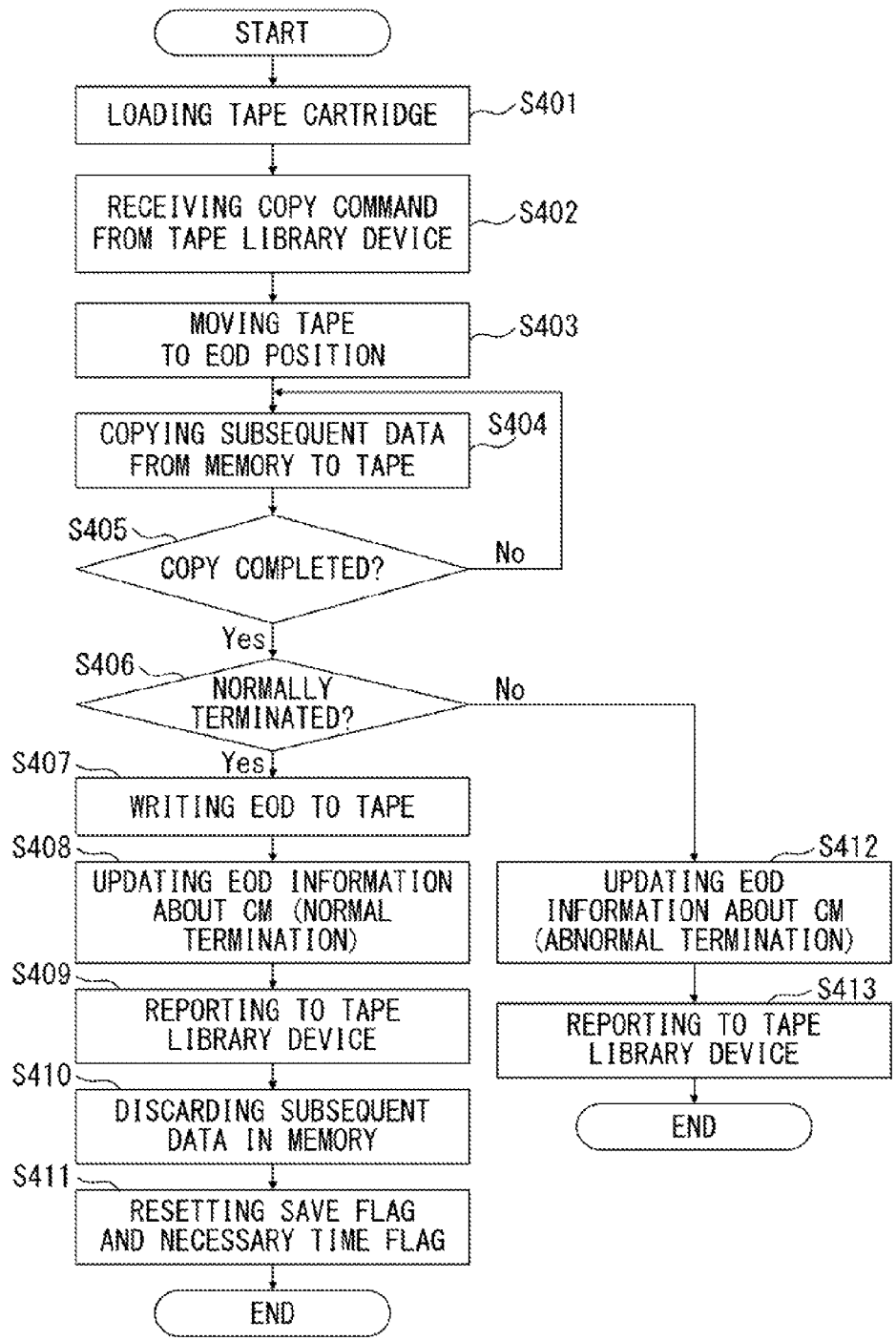
F I G. 7

TAPE DRIVE DEVICE, TAPE LIBRARY DEVICE, AND DATA STORING METHOD

CROSS-REFERENCE TO RELATED APPLICATION

This application is based upon and claims the benefit of priority of the prior Japanese Patent Application No. 2011-178102, filed on Aug. 16, 2011, the entire contents of which are incorporated herein by reference.

FIELD

The embodiments discussed herein are related to data storing technology.

BACKGROUND

A tape drive device is to write data output from a host machine to a magnetic tape to record and store the data. A well-known tape drive device has buffer memory to smoothly communicate data with the host machine.

The data output from the host machine is temporarily accumulated in the buffer memory of the tape drive device, and then written to the magnetic tape. The writing process is performed when the amount of data accumulation in the buffer memory reaches a specified value (for example, 70% of the memory capacity), or when a specified instruction (for example a write file mark instruction, a rewind instruction, an unload instruction, etc.) is received from the host machine.

The write file mark instruction is to write the data as a mark indicating the end of a data file to the magnetic tape. The rewind instruction is to rewind the magnetic tape. The unload instruction is to eject a cartridge tape from the tape drive device.

Since the buffer memory provided for the tape drive device is used as described above, volatile memory which has a high free level of access and is accessed at a high speed is generally used as the buffer memory.

The magnetic tape device is a storage device which has been long used in the history of a computer system for a batch job mainly under the control of the mainframe machine. The magnetic tape device is recently used for a high-speed backup of a large volume of data under the control of various open systems.

In the wide use of the device, a batch job uses a small block size of data and a small file size. Therefore, reading and writing operations of data are frequently performed to a magnetic tape. Accordingly, the capacity of the buffer memory of the device is small, for example, 32 kilobytes, and the activating and stopping time in operating a magnetic tape when the position of the magnetic tape is performed in a short time with high accuracy is, for example, several ten milliseconds. In addition, the data transfer function among the host machines of devices is 20 megabytes/second sufficiently. Furthermore, the magnetic tape medium used in this application has been changed from an open reel device to a cartridge device. The recording capacity of the magnetic tape medium ranges from 200 megabytes to 800 megabytes (when data is not compressed), and the length of the magnetic tape is about 335 m (thickness of the tape is about 27 micrometers).

Data has been recorded on the magnetic tape in one way of 9 through 18 data tracks in the tape width direction at the early stage of the cartridge device, and in both ways of 18 data tracks (a total of 36 data tracks) at the later stage of the device.

On the other hand, the magnetic tape device in the LTO (linear tape open) specification which is the dominant device in a backup application is appropriate for backup of a large volume of data of large block size and file size.

The recording capacity of the cartridge in the magnetic tape device ranges from 100 gigabytes (when data is not compressed) in the first generation to 1500 gigabytes (when data is not compressed) in the latest fifth generation. On the other hand, since the shape of the cartridge is not largely different from that in the batch job period, the magnetic tape becomes longer and thinner, and is 846 meter long and 6 micrometer thick.

In recording data on the magnetic tape in the LTO specification in the fifth generation, data is written to a total of 1280 data tracks by moving 40 times back and forth on 16 data tracks. The transfer function with the host machine is performed at a high speed of 140 megabytes/second in the fifth generation. Thus, since a large volume of data is processed, the desired buffer memory is as large as 256 megabytes.

The specification of the magnetic tape device is prepared to avoid as much as possible the activating and stopping operations on the magnetic tape on which a large volume of data is read and written with the physical restriction of the thickness of the magnetic tape, and the speed used to activate and stop the tape is as low as 3 or 4 seconds.

With a larger capacity of the magnetic tape recording device, the production information, the specification information, the quality information, etc. about the magnetic tape are to be recorded and updated on the magnetic tape. In the LTO specification, the tape cartridge which sores a magnetic tape is designed to include a noncontact and non-volatile memory device, and various types of management information are recorded and updated in the memory.

Another background technique is to include non-volatile memory in the tape cartridge which stores a magnetic tape, and store in the memory the management information about the recorded contents of the data on the magnetic tape.

There are the techniques described in the following documents.

Document 1: Japanese Laid-open Patent Publication No. 2003-123342
Document 2: Japanese Laid-open Patent Publication No. H11-316987
Document 3: Japanese Laid-open Patent Publication No. S60-32177

The tape drive device reads and writes data in the period in which the magnetic tape is stably driven at a constant speed. Although the drive of the magnetic tape is to be stopped after completing the write of data, the magnetic tape is not stopped immediately. Therefore, the position of the magnetic head for recording data on the magnetic tape is apart from the position of the completion of the write of the data when the drive of the magnetic tape is completely stopped. Therefore, if the next data is to be written on the magnetic tape without space from the completion position of the write, the rewinding operation of the magnetic tape is performed to some extent, and then the driving operation is resumes in the direction of the write. Then, after driving the magnetic tape at a constant speed, it is preferable to write the next data when the write completion position passes the position of the magnetic head while recognizing the data block number recorded on the magnetic tape and the position information on the magnetic tape.

As described above, the tape drive in the LTO specification is good at writing and reading data of a large block size and a large file size at a high transfer speed.

However, the magnetic tape recording device operates at instructions on a data block size, a file size, etc. output from the host machine. For example, assume that the data transfer speed is low on the host machine, for example, when data of small block size and a small file size is transmitted to the tape drive in the LTO specification, when data is discontinuously transmitted from the host machine, etc. In this case, since sometime is used to reach a specified capacity of buffer memory, the tape drive temporarily stops the operation of the tape, and when the specified capacity of the buffer memory is reached, the operation of writing data on the magnetic tape is resumed. Therefore, the processes of grasping the write completion position, and activating and stopping time of the magnetic tape are used for the tape drive. In addition, when an instruction as a trigger of writing data on the magnetic tape is transmitted each time a small volume of data is accumulated on the buffer memory, the tape drive frequently activates and stops the magnetic tape, thereby degrading the data transfer function of the tape drive.

The tape drive in the LTO specification has the system of suppressing the excessive reduction of the data transfer function between the host machine and the drive by reducing the activating and stopping operations of the magnetic tape by setting a lower writing speed on the magnetic tape when the data transfer speed on the host machine side is slow. The system is referred to as a speed matching function etc. by some drive manufacturers.

The function effectively works on the 30% through 40% of the maximum transfer function of the tape drive in the LTO specification. However, in using the above-mentioned batch job, a low transfer speed exceeding the corresponding range of the speed matching function is used. Therefore, the function in the LTO specification does not fully work.

On the other hand, the magnetic tape recording device for enterprises having a specification similar to the LTO specification may have the function referred to as a skip-sink function etc. as a function intended for a batch job use under control of the mainframe. The function makes the speed of the transfer function of the tape drive viewed from the host machine look faster by discontinuously writing data on the magnetic tape without stopping the tape operation when the data transmitted from the host machine is written on the tape. Then, the data is rewritten for continuity by reading again the data discontinuously written on the magnetic tape by the tape drive.

However, in this function, if there is a partially damaged or stained portion in the rewrite position when the data is rewritten, the data rewriting process may fail and the data may be lost.

SUMMARY

According to an aspect of the embodiment, a tape drive device for storing data in a tape cartridge which includes a magnetic tape and non-volatile semiconductor memory, the tape drive device includes: a comparison unit that compares a transfer speed of data transmitted from a host machine to the tape drive device with a speed threshold; a speed determination unit that determines a writing speed to a tape cartridge using the speed threshold; and a data write unit that writes data to the tape cartridge, the data write unit writing data to the magnetic tape provided for the tape cartridge when the determined writing speed is higher than the speed threshold, and the data write unit writing subsequent data following data written to the magnetic tape to the non-volatile semiconductor memory provided for the tape cartridge when the determined writing speed is lower than the speed threshold.

According to another aspect of the embodiment, a tape library device includes: a plurality of tape drive devices; an unmount instruction determination unit that determines whether or not an instruction to unmount a tape cartridge mounted on one of the plurality of the tape drive devices has been received from a transmitter of data stored on the tape cartridge, the tape cartridge including a magnetic tape and non-volatile semiconductor memory; a determination unit that determines whether or not a copy time used to copy data written to the non-volatile semiconductor memory of the tape cartridge related to the instruction from the non-volatile semiconductor memory to the magnetic tape of the tape cartridge is shorter than a specified time threshold when the unmount instruction determination unit determines that the unmount instruction has been received; a tape cartridge mount unit that unmounts the tape cartridge from the one of the plurality of the tape drive devices and that mounts the tape cartridge on another tape drive device of the plurality of the tape drive devices when the determination unit determines that the copy time is shorter than the specified time threshold; and a tape drive device control unit that issues a specified instruction to the another tape drive device to allow the another tape drive device to copy the data written to the non-volatile semiconductor memory of the tape cartridge from the non-volatile semiconductor memory to the magnetic tape of the tape cartridge.

According to yet another aspect of the embodiment, a data storing method of storing data in a tape cartridge in which the tape cartridge has a magnetic tape and non-volatile semiconductor memory, the data storing method comprising: detecting a transfer speed of data transmitted from a host machine; comparing the detected transfer speed with a speed threshold; and writing the data to the magnetic tape provided for the tape cartridge when the detected transfer speed is higher than the speed threshold, and writing subsequent data after data written to the magnetic tape to the non-volatile semiconductor memory provided for the tape cartridge when the detected transfer speed is lower than the speed threshold.

The object and advantages of the invention will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is the configuration of the function of an embodiment of a tape drive device and a tape cartridge.

FIG. 5 is a flowchart of the contents of a saved data reading process.

FIG. 7 is a flowchart of the contents of a drive side subsequent data write controlling process.

DESCRIPTION OF EMBODIMENTS

Figure 2:
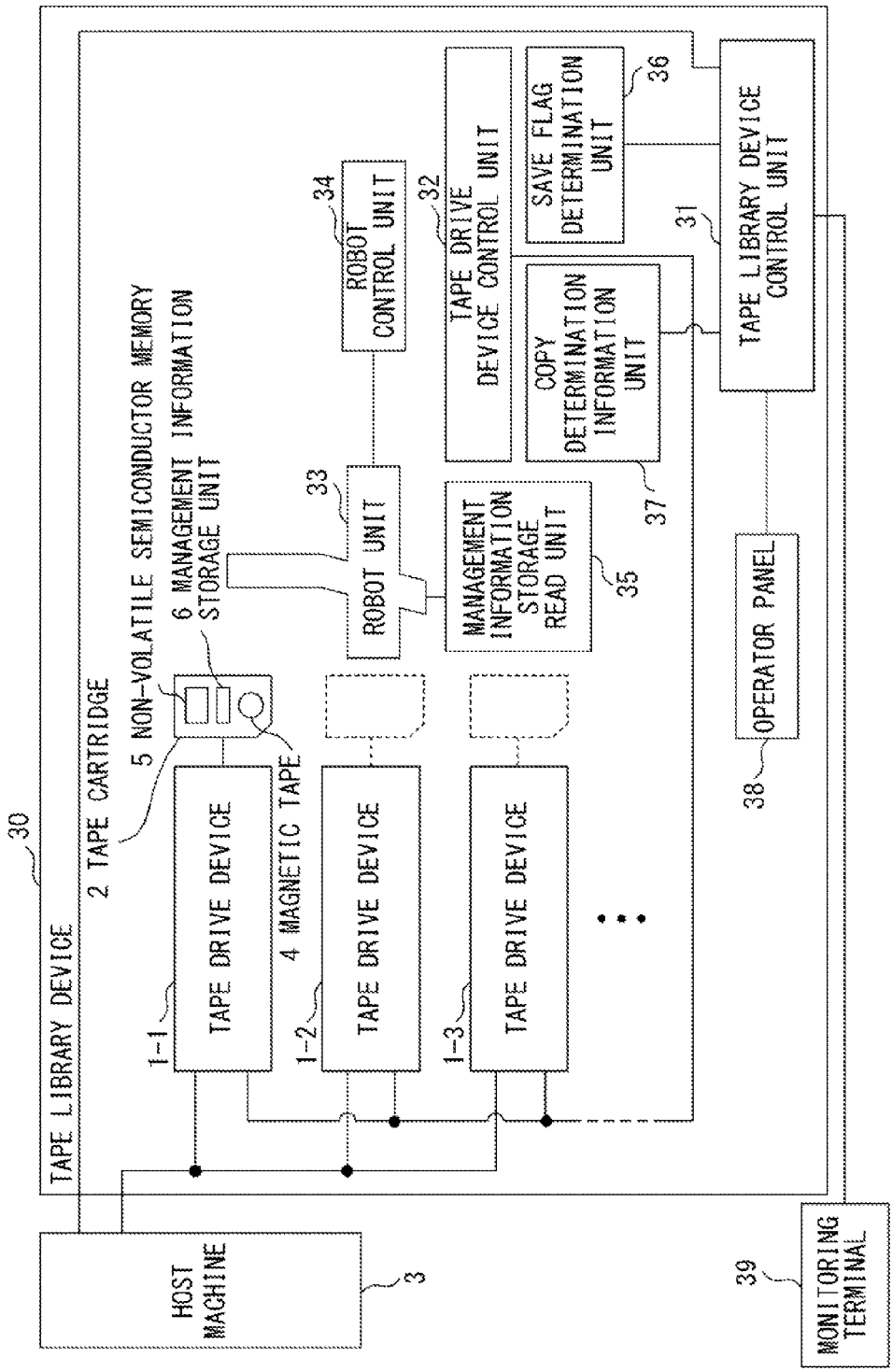
FIG. 2 is the configuration of the function of an embodiment of the tape library device.

Preferred embodiments of the present invention will be explained with reference to accompanying drawings.

Described first below is the configuration illustrated in FIG. 1. FIG. 1 is the configuration of the function of an embodiment of a tape drive device and a tape cartridge.

A tape cartridge 2 is mounted on a tape drive device 1, and a host machine 3 is connected to the tape drive device 1.

The tape cartridge 2 includes a magnetic tape 4 and non-volatile semiconductor memory 5 as storage media for storing and holding data. Specifically, the non-volatile semiconductor memory 5 holds subsequent data described later.

The host machine 3 is the source of data, for example, a server device in a computer network. The tape drive device 1 stores the data transmitted from the host machine 3 in the tape cartridge 2.

The tape drive device 1 may be provided in a tape library device 30 described later.

The tape drive device 1 includes a comparison unit 11, a speed determination unit 12, and a data write unit 13.

The comparison unit 11 compares the transfer speed of the data transmitted from the host machine 3 to the tape drive device 1 with a specified speed threshold. The transfer speed of the data is detected based on the feature value of the data. The feature value of the data is, for example, at least one of the block size of the data transmitted from the host machine 3, the amount (file size) of the transmitted data, and the index indicating the continuity of the transmitted data.

The speed determination unit 12 determines the writing speed to the tape cartridge 2 based on the speed threshold.

The data write unit 13 writes the data transmitted from the host machine 3 to the tape cartridge 2. When the determined writing speed is higher than the speed threshold, the data write unit 13 writes the data on the magnetic tape 4 provided for the tape cartridge 2. When the determined writing speed becomes lower than the speed threshold, the data write unit 13 starts writing the subsequent data including the logical block number at the head of the subsequent data following the data written to the magnetic tape 4 and the subsequent data in the non-volatile semiconductor memory 5 provided in the tape cartridge 2.

The operation of the magnetic tape 4 is not used in writing data to the non-volatile semiconductor memory 5. With the above-mentioned configuration, the tape drive device 1 illustrated in FIG. 1 changes the data write destination from the magnetic tape 4 to the non-volatile semiconductor memory 5 provided in the tape cartridge 2 when it is needed to write data at a low transfer speed.

By performing the operation, the tape drive device 1 writes data to the tape cartridge 2 for storage even at the transfer speed which is as low as the speed at which the data is not written using the speed matching function. Therefore, although the data transmitted from the host machine 3 has, for example, a small block size or file size, the data is stored in the tape cartridge 2 at a sufficiently appropriate transfer speed as compared with the conventional device.

The conventional magnetic tape device uses a position controlling operation in second to write data continuously from the stopping state of the magnetic tape operation to the end of the data recorded on the magnetic tape until the data is accumulated with the specified capacity of the buffer memory. Therefore, the transfer speed of the data on the conventional magnetic tape device when viewed from the host machine 3 has been conspicuously reduced.

On the other hand, the tape drive device 1 illustrated in FIG. 1 does not use the position control of the magnetic tape 4 by storing the data in the non-volatile semiconductor memory 5, thereby appropriately storing data on the tape cartridge 2.

The tape drive device 1 further includes a reply information transmission unit 14 and a delay unit 15.

With respect to a data transfer, the reply information transmission unit 14 returns to the host machine 3 the reply information, for example, that the data write unit 13 has written the data to the tape cartridge 2 in response to the command (write command, read command, etc.) relating to the transmission and reception of the data from the host machine 3. The reply information transmission unit 14 returns to the host machine 3 the reply information that a data read unit 19 described later has read the data from the tape cartridge 2.

When the data write unit 13 writes and reads data to and from the non-volatile semiconductor memory 5 in the tape cartridge 2, the delay unit 15 delays the transmission of the reply information by the reply information transmission unit 14.

The write and read data to and from the non-volatile semiconductor memory 5 is performed at a higher speed than in writing and reading data to and from the magnetic tape 4. Therefore, when the above-mentioned reply information is transmitted to the host machine 3 immediately after the reading and writing operations with the specification of the non-volatile semiconductor memory 5 maintained as is, the host machine 3 assumes that the tape drive device 1 has a transfer function quite different from the original transfer function.

Then, when data is written and read to and from the non-volatile semiconductor memory 5, the delay unit 15 in the tape drive device 1 delays the transmission speed of the reply information from the reply information transmission unit 14 depending on the capacity of the memory within the range of the transfer speed of the specification of the tape drive device 1. With the configuration of the tape drive device 1, the host machine 3 constantly transmits and receives data at the transfer speed within the range of the specification of the tape drive device 1.

The tape drive device 1 further includes a subsequent data position identification storage unit 16.

When the data write unit 13 writes the subsequent data to the non-volatile semiconductor memory 5, the subsequent data position identification storage unit 16 stores the logical block number of the leading (first) data of the subsequent data. The information is also stored in the non-volatile semiconductor memory 5.

According to the logical block number of the leading (first) data of the subsequent data stored in the subsequent data position identification storage unit 16, it is known from which logical block number the data transmitted from the host machine 3 is separated, and stored in the magnetic tape 4 and the non-volatile semiconductor memory 5. Therefore, through the tape drive device 1, all data stored in the tape cartridge 2 is easily accessed.

The tape drive device 1 further includes an access reception unit 17, an access destination determination unit 18, and the data read unit 19.

The access reception unit 17 receives an instruction about access to the data transmitted from the host machine 3 which issues an instruction to the tape drive device 1 relating to a data transfer.

The access destination determination unit 18 determines whether the logical block number of the access destination relates to the data written to the magnetic tape 4 in the tape cartridge 2 or the subsequent data written to the non-volatile semiconductor memory 5 in the tape cartridge 2. The access destination determination unit 18 makes the determination based on the logical block number about the leading (first) data of the subsequent data stored in the subsequent data position identification storage unit 16.

The data read unit 19 reads the data specified by the host machine 3 from the tape cartridge 2. The reading operation is performed from one of the data written to the magnetic tape and the subsequent data written to the non-volatile semiconductor memory 5 based on the determination result of the access destination determination unit 18 on the logical block number of the read data. The data read unit 19 outputs the read data to the host machine 3.

With the configuration of the tape drive device 1, the host machine 3 accesses all data separately stored in the magnetic tape 4 and non-volatile semiconductor memory 5 in the tape cartridge 2.

As described above, writing and reading data to and from the non-volatile semiconductor memory 5 is performed at a higher speed than in writing and reading data to and from the magnetic tape 4. Therefore, when the data read unit 19 reads data from the non-volatile semiconductor memory 5, the delay unit 15 may be used as in the above-mentioned writing process. That is, a reply may be transmitted to the host machine 3 with the transfer speed of the reply information from the reply information transmission unit 14 depending on the capacity of the non-volatile semiconductor memory 5 delayed within the range of the transfer speed of the specification of the tape drive device 1. With the configuration of the tape drive device 1, the host machine 3 constantly transmits and receives data at a transfer speed in the range of the specification of the tape drive device 1.

The tape cartridge 2 in FIG. 1 further includes a management information storage unit 6. The management information storage unit 6 stores the manufacture information about the tape cartridge 2 itself, the use frequency for the tape drive device 1, and the quality information about the data recorded on the magnetic tape 4. The management information storage unit 6 is configured by non-volatile semiconductor memory other than the non-volatile semiconductor memory 5, but the memory may be shared.

The tape drive device 1 further includes a management information storage control unit 20.

The management information storage control unit 20 updates the information stored in the management information storage unit 6 provided for the tape cartridge 2. Especially, the management information storage control unit 20 stores in the management information storage unit 6 the information that the subsequent data is recorded in the non-volatile semiconductor memory 5 when the data write unit 13 writes the subsequent data in the non-volatile semiconductor memory 5.

In the tape drive device 1, the logical block number about the leading (first) data of the subsequent data in the non-volatile semiconductor memory 5 of the tape cartridge 2. In addition, the information that the data is recorded in the non-volatile semiconductor memory 5 is stored in the management information storage unit 6 of the tape cartridge 2. Therefore, although the tape cartridge 2 in which the data is separately stored in the magnetic tape 4 and the non-volatile semiconductor memory 5 is ejected from the tape drive device 1, access to all data stored in the tape cartridge 2 is easily performed.

The information stored in the management information storage unit 6 of the tape cartridge 2 and indicating that the data is stored in the non-volatile semiconductor memory 5 is set as first save flag information in a part of the memory area of the management information storage unit 6. As described above, when the tape cartridge 2 is loaded into another tape drive device, the first save flag information is used in determining whether or not the data is recorded in the non-volatile semiconductor memory 5 of the tape cartridge 2.

The writing speed of data to the tape cartridge 2 is described by the speed determination unit 12 of the tape drive device 1 as described above. When the writing speed becomes lower than the speed threshold, the data is recorded in the non-volatile semiconductor memory 5. Therefore, when the data recorded in the non-volatile semiconductor memory 5 is copied to the magnetic tape 4, the processing time used to copy the data is estimated from the writing speed. If the processing time falls short of, for example, 90% of the minimum speed of the speed matching function of the tape drive device 1 (further performance reduction of 10% lower than the lower limit), the second save flag information is set in a part of the memory area of the management information storage unit when the data is copied to the magnetic tape. The second save flag information indicates that the processing time falls short of the specification of the tape drive device.

As described above, when the data is copied from the non-volatile semiconductor memory 5 of the tape cartridge 2 to the magnetic tape 4, the second save flag information is used if the processing time falls short of the specification of the tape drive device 1. For example, as described later, the first save flag information is used in determining whether or not the data is to be copied using an available drive provided for the tape drive device 1. If the data recorded in the non-volatile semiconductor memory 5 is a data group smaller in block size or file size, the activating and stopping operation time of the magnetic tape 4 is not ignorable, thereby requiring the processing time more than the expected amount of data to be copied. In this case, it is known whether or not some time is desired to copy the data to the magnetic tape 4 by checking whether or not the second save flag information is set.

The tape drive device 1 further includes an error determination unit 21.

The tape drive device 1 includes a magnetic head for writing data to the magnetic tape 4 and a magnetic head for reading data from the magnetic tape 4. Therefore, immediately after writing data to the magnetic tape 4, the written data is read from the magnetic tape 4, and the consistency of the data may be checked by the error determination unit 21. When there is no consistency between the written data and the read data, it indicates there is an error in the data. In this case, the tape drive device 1 rewrites the data for error correction.

The error determination unit 21 obtains the amount of written data, the amount of read data, and the amount of error in the data, and stores the result as the quality information in the management information storage unit 6 of the tape cartridge 2 through the management information storage control unit 20.

The error correction information is also recorded on the magnetic tape 4 for compensation of the written data in addition to the data from the host machine 3. Specifically, since there is no data to be compared for consistency on the tape drive device 1 side and the host machine 3 side when data is read from the magnetic tape 4, the corrected data is transmitted to the host machine 3 using the error correction information written to the magnetic tape 4.

The tape drive device 1 is provided with a subsequent data copy unit 22. The subsequent data copy unit 22 first receives the subsequent data from the non-volatile semiconductor memory 5 to the data write unit 13 which is transmitted from the access destination determination unit 18 at a specified instruction. Then, the subsequent data is continuously copied after the data already written to the magnetic tape 4 provided for the tape cartridge 2. In copying the data, the subsequent data from the non-volatile semiconductor memory 5 is written to the magnetic tape 4 as in writing the data transmitted from the host machine 3 to the magnetic tape 4.

In addition, the tape drive device 1 further includes a normal termination determination unit 23 and a subsequent data discard unit 24.

The normal termination determination unit 23 determines whether or not the subsequent data copying operation has been normally completed according to the information which is received from the subsequent data copy unit 22 and indicates that all subsequent data to be written from the non-volatile semiconductor memory 5 to the magnetic tape 4 has been transmitted, and the information which is received from the data write unit 13 and indicates that all subsequent data transmitted from the non-volatile semiconductor memory 5 has been copied to the magnetic tape 4. Then, the subsequent data discard unit 24 performs the process of discarding the subsequent data recorded in the non-volatile semiconductor memory 5 at the instruction from the normal termination determination unit 23 only when the normal termination determination unit 23 determines that the copying operation has been normally completed.

That is, the subsequent data discard unit 24 does not discard the subsequent data from the non-volatile semiconductor memory 5 if the copying operation of the subsequent data by the subsequent data copy unit 22 has failed for any reason. That is, in this case, the subsequent data is still maintained in the non-volatile semiconductor memory 5. Therefore, the tape drive device 1 provides high data integrity.

Described next is the configuration illustrated in FIG. 2. FIG. 2 is the configuration of the function of an embodiment of the tape library device.

The host machine 3 is connected to the tape library device 30 in FIG. 2.

The tape library device 30 includes at least one tape drive device 1-1. When the tape library device 30 includes a plurality of tape drive devices 1, the tape drive devices are assigned the respective reference numerals 1-1, 1-2, 1-3, . . . .

The tape library device 30 includes a tape library device control unit 31, a tape drive device control unit 32, a robot unit 33, a robot control unit 34, a management information storage read unit 35, a save flag determination unit 36, a copy determination information unit 37, and an operator panel 38.

Each of the tape drive devices 1-1, 1-2, 1-3, . . . is connected to the host machine 3 and the tape drive device control unit 32, and the tape library device control unit 31 is connected to the host machine 3 and the operator panel 38. Furthermore, the tape library device control unit 31 is provided with a LAN (local area network) port, and a monitoring terminal 39 (personal computer (PC) etc.) of the tape library device 30 may be connected to the LAN port.

Each of the tape drive devices 1-1, 1-2, 1-3, . . . has the configuration of the tape drive device 1 illustrated in FIG. 1. In FIG. 2, the tape cartridge 2 is loaded only into the tape drive device 1-1. The tape cartridge 2 also includes the magnetic tape 4, the non-volatile semiconductor memory 5, and the management information storage unit 6 similar to those illustrated in FIG. 1.

In the following description, unless otherwise specified, the tape drive devices 1-1, 1-2, 1-3, . . . are generally referred to as "a plurality of tape drive devices 1".

The tape library device control unit 31 performs, for example, various types of controlling operations.

Writing the setting information from the operator panel 38 or the monitoring terminal 39 to the copy determination information unit 37

Writing the save flag information read by the management information storage read unit 35 provided for the robot unit 33 to the save flag determination unit 36

Instruction of the unmounting operation on the tape drive device 1 to be instructed depending on the unmount instruction of the tape cartridge 2 from the host machine 3

Instruction to the robot control unit 34 to convey the tape cartridge 2 ejected from the tape drive device 1 to a specified rack (cartridge cell) in the tape library device 30

Instruction to the robot control unit 34 to convey data from the rack of the specified tape cartridge 2 to the specified tape drive device 1 according to the instruction from the host machine 3

Mount instruction of the tape cartridge 2 to the tape drive device 1 for the tape drive device 1

The tape drive device control unit 32 performs various controlling operations as follows, for example.

Copy instruction to the tape drive device 1 for performing the copying process when data is copied from the non-volatile semiconductor memory 5 of the tape cartridge 2 to the magnetic tape 4 based on the information from the copy determination information unit 37 or the save flag determination unit 36

Read instruction of the information in the management information storage unit of the tape cartridge 2 to the management information storage read unit 35 provided in the robot unit 33

The robot control unit 34 performs the operation of the robot unit 33 at the instruction from the tape library device control unit 31. The robot unit 33 is a mechanism which conveys the tape cartridge 2 between the rack of the tape library device 30 and the tape drive device 1.

The management information storage read unit 35 reads the information recorded on the management information storage unit 6 of the tape cartridge 2.

The save flag determination unit 36 determines the save flag information read by the management information storage read unit 35.

The copy determination information unit 37 holds the setting information received from the operator panel 38 and the monitoring terminal 39.

The operator panel 38 is provided for the tape library device 30, and an operator (device manager) issues an instruction to set the tape library device 30 and to perform the operation of the robot unit 33 by manually operating the operator panel 38.

The monitoring terminal 39 of the tape library device 30 issues various setting instructions to the tape library device 30 and an instruction of the operation of the robot unit 33 using a general purpose Internet browser software.

The host machine 3 first issues an unload instruction to the tape drive device 1 on which the tape cartridge 2 that has completed writing the data transferred from the host machine is mounted. The unload instruction is generally to completely wind the magnetic tape 4 on the tape cartridge 2, and eject the tape cartridge 2 from the tape drive device 1 (assume that the tape cartridge 2 pops out in the ejecting position).

Next, the host machine 3 executes the unmount instruction on the tape library device 30 to return the tape cartridge 2 to a specified rack of the tape library device 30.

Next, when the tape cartridge 2 is completely ejected, the tape drive device 1 reports the termination of the unloading operation to the host machine 3. The tape drive device control unit 32 monitors the tape drive device 1 until the tape cartridge 2 is ejected. When the ejection of the tape cartridge 2 is confirmed, the tape drive device control unit 32 reports the completion of the ejection to the tape library device control unit 31. The tape library device control unit 31 issues a convey instruction of the tape cartridge 2 to the robot control unit 34. Then, the robot unit 33 moves to the position of the tape drive device 1 which is ejecting the tape cartridge 2, holds the tape cartridge 2, and then takes in the tape cartridge 2 for conveyance.

The tape drive device control unit 32 reads the save flag information from the management information storage unit 6 of the tape cartridge 2 when the robot unit 33 holds the tape cartridge 2 or when the robot unit 33 takes the tape cartridge 2 into the robot unit 33. Then, according to the setting information in the copy determination information unit 37 of the tape library device 30, it is determined whether or not the copying process is to be performed.

Unless the first save flag information is set in the management information storage unit 6 of the tape cartridge 2, the data is not recorded in the non-volatile semiconductor memory 5 of the tape cartridge 2. Therefore, the copying process is not desired. In this case, the tape library device control unit 31 continues the unmounting process by the robot unit 33, and completes the conveyance of the tape cartridge 2 to the specified rack, thereby reporting the completion of the unmounting process to the host machine 3.

On the other hand, When the first save flag information is set in the management information storage unit 6 of the tape cartridge 2, the tape drive device control unit 32 confirms whether or not the second save flag information is set.

If the first save flag information is not set, it indicates that the time in which the process of copying the data recorded in the non-volatile semiconductor memory 5 of the tape cartridge 2 to the magnetic tape 4 is performed falls short of the specification of the tape drive device 1. Therefore, in this case, the copying process is performed using the tape drive device 1 which is loaded into the tape library device 30 and is available.

In this case, in response to the unmount instruction from the host machine 3, the report of the completion of the unmounting process is issued when, for example, the device is mounted from the tape drive device 1 which has just mounted the device to another available tape drive device 1. Thus, the host machine 3 does not desire the awareness or consideration on the copying process.

Figure 3:
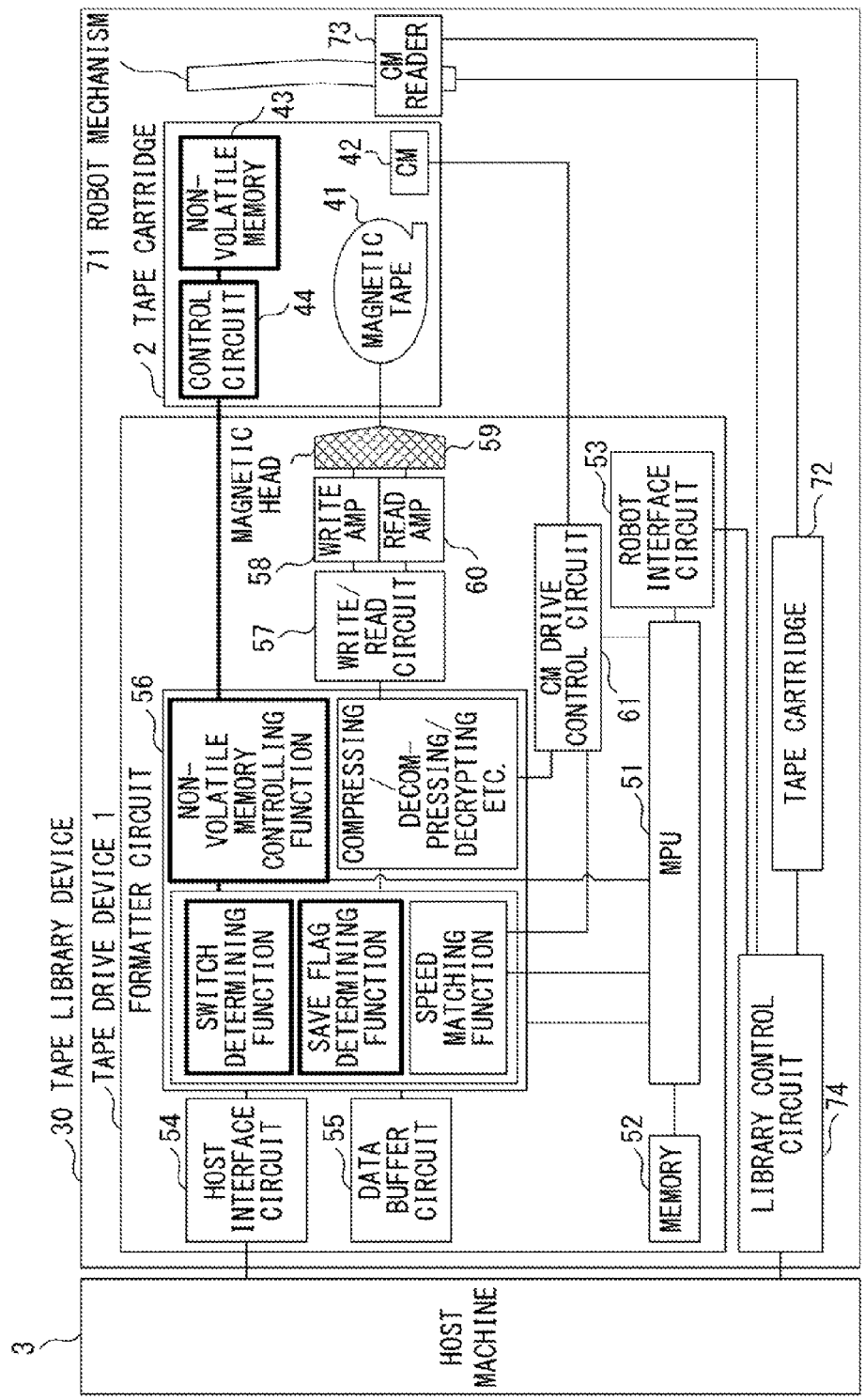
FIG. 3 is a practical configuration of an embodiment of the tape drive device, the tape cartridge, and a tape library device.

Described next is the configuration illustrated in f 3. FIG. 3 is a practical configuration of an embodiment of the tape drive device, the tape cartridge, and a tape library device.

In FIG. 3, the host machine 3 is connected to the tape library device 30. The tape library device 30 includes a plurality of tape drive devices 1. In FIG. 3, only one tape drive device 1 for the tape library device 30 is illustrated for convenience.

The tape cartridge 2 is mounted on the tape drive device 1. The tape drive device 1 and the tape cartridge 2 according to the present embodiment are designed based on the LTO specification widely known as the standards of the magnetic tape for a computer.

Described first is a practical configuration of the tape cartridge 2.

The tape cartridge 2 according to the present embodiment includes a magnetic tape 41, a CM 42, a non-volatile memory 43, and a control circuit 44.

The magnetic tape 41 is a storage medium for holding the data written to the tape cartridge 2, and is accommodated as wound on the reel hub in the tape cartridge 2. The magnetic tape 41 corresponds to the magnetic tape 4 provided for the tape cartridge 2 in FIG. 1.

The CM (cartridge memory) 42 is a memory to record the medium management information such as the manufacture information about a tape cartridge, the use history information about data, etc. The CM 42 of the LTO specification may be, in addition to the IC cards widespread and used by railway corporations and bus transportation companies in Japan, non-contact communication means and electric power supply means, and the recording unit may be a non-volatile semiconductor storage device such as flash memory etc. The CM 42 corresponds to the management information storage unit 6 provided for the tape cartridge 2 in FIG. 1.

The non-volatile memory 43 is a non-volatile semiconductor memory and holds the data to be written to the tape cartridge 2 like the magnetic tape 41. The non-volatile memory 43 may be, for example, flash memory etc. The non-volatile memory 43 corresponds to the non-volatile semiconductor memory 5 provided for the tape cartridge 2 in FIG. 1.

The control circuit 44 writes, read, and clears the data by controlling the non-volatile memory 43.

It is preferable that the capacity of the non-volatile memory 43 satisfies the file size which is processed at least by a normal mainframe. In the present embodiment, it is assumed that the capacity of the non-volatile memory 43 is 10 GB approximately. If the non-volatile memory 43 is provided with the storage capacity of this level, it is considered that a tape device capable of performing a high-speed writing process with a large capacity in the LTO specification etc. in the conventional mainframe is good enough to perform a batch job.

In the present embodiment, the integrity of data may be improved by maintaining redundant data stored in the non-volatile memory 43 with the non-volatile memory 43 duplicated and the control circuit 44 having the functions of comparing data and performing error correction.

Although described later in detail, an area for holding some pieces of flag information is reserved in a storage area of the CM 42 which can be rewritten. One of the flags indicates that the subsequent data has been written to the non-volatile memory 43. Another flag indicates the prohibition of data write to the magnetic tape 4. The write protect flag is set when data write fails due to the magnetic tape 41. The setting state of the write protect flag is prioritized over a physical write protect key (switch) of a tape cartridge.

In FIG. 3, the CM 42 is separated from the non-volatile memory 43. Instead, if high-speed and stable access is realized even with non-contact communications, both of the CM 42 and the non-volatile memory 43 may be configured by, for example, using one flash memory unit.

Described next is a practical configuration of the tape drive device 1 in FIG. 3.

The tape drive device 1 according to the present embodiment first includes a MPU 51, memory 52, a robot interface circuit 53, and a host interface circuit 54.

The MPU (microprocessor unit) 51 is a processor for controlling the operation of each component configuring the tape drive device 1.

The memory 52 includes RAM (random access memory) and non-volatile memory corresponding to conventional ROM (read only memory). The RAM is used in temporarily storing various types of data depending on the necessity when the MPU 51 performs the above-mentioned controlling operation. Furthermore, the control program executed by the MPU 51 is to be recorded in the tape drive device 1 in advance, and also it may be needed to correct the control program for any reason. Therefore, currently used is non-volatile semiconductor memory such as flash memory which is capable of directly rewriting a program, not physically replacing a memory device. The MPU 51 performs the above-mentioned controlling operation by reading the control program from the non-volatile memory and executing the program.

The robot interface circuit 53 provides a communication interface for communicating various commands with the tape library device 30 provided with the tape drive device 1 and performing data communications for reception of the information on the tape drive device 1. According to the present embodiment, the robot interface circuit 53 provides a specific communication device provided by a tape drive vendor using a communication interface in accordance with the RS-422 hardware standard which is the standard of the widely known serial communication, and a communication device having common specifications among tape drive vendors.

The host interface circuit 54 provides a communication interface for performing data communications for communicating various types of data with the host machine 3 as a source of data stored in the tape cartridge 2. In the present embodiment, the host interface circuit 54 provides a communication interface in accordance with the well-known SCSI (small computer system interface) standard, the SAS (serial attached SCSI) standard, or the FC (fibre channel) standard.

Furthermore, the tape drive device 1 according to the present embodiment includes a data buffer circuit 55 and a formatter circuit 56.

The data buffer circuit 55 is a storage area prepared for temporarily holding data to compensate for the shift of timing generated between the input and the process in the input/output process between the host machine and the tape drive device.

The data transmitted from the host machine 3 is temporarily stored in the data buffer circuit 55 through the formatter circuit 56 described later. Then, the data is appropriately taken out of the data buffer circuit 55 by the formatter circuit 56, handled by a process such as a compressing process etc. according to need, and then written to the magnetic tape 41 by driving a magnetic head 59 (write side) by a write amplifier 58 through a write/read circuit 57 described later.

The formatter circuit 56 performs compressing and decompressing data, encrypting and decrypting data, modulating and demodulating for format conversion of data, controlling the data buffer circuit 55, etc. The formatter circuit 56 according to the present embodiment further provides a speed matching function, a switch determining function, a save flag determining function, and a non-volatile memory controlling function.

In the functions above, the speed matching function is to write data to the magnetic tape 41 of the tape cartridge 2 without stopping as long as possible the tape driving operation by the tape drive device 1.

The switching determining function is to detect that the data transfer speed has fallen short of the lower limit that is handled by the speed matching function, and switch the subsequent data rewrite destination to the non-volatile memory 43 provided in the tape cartridge 2. The switch determining function also provides the function of switching the data read from the tape cartridge 2 between the magnetic tape 41 and the non-volatile memory 43 depending on the contents of holding the save information by the CM 42 provided in the tape cartridge 2.

The save flag determining function provides the function of detecting and determining according to the save flag information that the subsequent data has been saved in the non-volatile memory 43 provided in the tape cartridge 2.

The non-volatile memory controlling function provides the function of performing communications with the control circuit 44 provided in the tape cartridge 2, the function of data communications for communicating stored data through the control circuit 44, and the function of deleting the stored data in the non-volatile memory 43.

The tape drive device 1 according to the present embodiment further includes the write/read circuit 57, the write amplifier 58, the magnetic head 59, a read amplifier 60, and a CM drive control circuit 61.

The write/read circuit 57 performs modulation for magnetically recording a digital signal on the magnetic tape 41 in the tape cartridge 2 and demodulation for obtaining a digital signal from a signal read from the magnetic head 59.

The write amplifier 58 drives the magnetic head 59 for magnetically recording data to the magnetic tape 41 according to a modulation signal output from the write/read circuit 57.

The magnetic head 59 includes a write head for write of a magnetic signal to the magnetic tape 41, and a read head for read of a magnetic signal from the magnetic tape.

As described above, 1280 strips (data tracks) of data are written and read on the magnetic tape of 12.6 millimeter width to, for example, the tape drive device and the tape cartridge in LTO specification of the fifth generation. Therefore, there is the system of positioning (tracking) the magnetic head 59 with high accuracy in the direction of the width of the magnetic tape. The magnetic tape is provided with five servo bands, and the magnetic head is provided with a serve head for reading a signal from the servo bands. The data write area on the magnetic tape is provided with four data bands as enclosed by five servo bands. The magnetic head reads the signal of the servo bands on both sides of the data band. With respect to one data band, 16 sets of write heads and read heads are position-controlled at 20 back-and-forth interval.

The read amplifier 60 amplifies the magnetic signal read from the magnetic tape 41 by the magnetic head 59 into the size appropriate for the process by the write/read circuit 57, and then outputs the resultant signal to the circuit at the subsequent stage.

The write/read circuit 57, the write amplifier 58, the magnetic head 59, and the read amplifier 60 are connected through the MPU 51, driven and controlled by the formatter circuit 56, and data is written and read on the magnetic tape 41.

The CM drive control circuit 61 drives the CM 42 in the tape cartridge 2, supplies power to the CM 42, and writes and read of various data with respect to the CM 42.

In the present embodiment, the CM drive control circuit 61 performs the data communication for transmission and reception of various data with the CM 42 by a well-known non-contact system. The non-contact system is adopted in a non-contact IC card etc., supplies power to the tape cartridge 2 by electromagnetic induction, and communicates data according to a high frequency modulation signal. In the present embodiment, the data communication between the formatter circuit 56 and the control circuit 44 in the tape cartridge 2 is performed using the configuration of an electric connection between the lines. It is obvious that the data communication between them may also be in the non-contact system.

The tape drive device 1 in FIG. 3 is configured as described above, and performs the following operation.

First, the tape drive device 1 detects the input/output speed (data input/output with respect to the host machine 3, data input/output with respect to the magnetic tape 41) of the data with respect to the data buffer circuit 55 as the transfer speed. The transfer speed is detected not from the speed at the moment of a data transfer or a momentary speed, but from an average value of a specified amount of data, for example, from the amount of data used when the transfer performance is switched by the speed matching function. The tape drive device 1 switches the write destination of the subsequent data to the non-volatile memory 43 in the tape cartridge 2 when the transfer speed detected by the function falls short of the lower limit which is handled by the speed matching function.

When the write destination of the subsequent data is switched to the non-volatile memory 43, the tape drive device 1 acquires the ID information (identification information) about the leading logical block of the subsequent data, and stores it in the memory 52 of the tape drive device 1 and the non-volatile memory 43. Upon receipt of the data access from the host machine 3, the tape drive device 1 determines according to the ID information which of the magnetic tape 41 and the non-volatile memory 43 holds the data to be accessed, and processes the access.

On the tape drive device 1, when data access is performed on the non-volatile memory 43, a selection setting is made as to whether the reply to the host machine 3 is made immediately when the access is completed or the reply is made with a delay of a specified time after the completion of the access. The setting is made because when the access speed to the semiconductor memory is compared with the access speed to the magnetic tape of a physical operation, the access speed to the semiconductor memory is generally much higher. That is, the setting selects which is to be performed for the reply speed as viewed from the host machine 3 when the data storage destination is switched from the magnetic tape 41 to the non-volatile memory 43, making the most of the performance by allowing the difference from the immediately preceding value, or suppressing the value as high as the immediately preceding value.

In this case, the delay time to be set when the reply after the completion of the data access equals the time desired to return a reply when, for example, data is written to the magnetic tape 4 at the lower limit of the speed matching function. Thus, it is not needed for the host machine 3 to be aware of or consider the data storage destination.

Furthermore, when the subsequent data write destination is switched to the non-volatile memory 43, the tape drive device 1 sets in the CM 42 the flag information about the switch.

In addition, the tape drive device 1 copies the subsequent data from the non-volatile memory 43 to the magnetic tape 41 in the tape cartridge 2.

Upon receipt of a dedicated command or a write command in which a specified option is specified, the tape drive device 1 performs the copying process. When the copying process is normally completed, the tape drive device 1 changes (releases) the setting of the flag information held in the CM 42, and discards (deletes) the copied subsequent data from the non-volatile memory 43.

When the data is completely written to the magnetic tape 41, the tape drive device 1 writes an EOD (end of data) mark indicating the end of the data, and updates the information about the EOD held in the CM 42. When the subsequent data is held in the non-volatile memory 43, the tape drive device 1 writes the EOD mark at the end of the subsequent data copied to the magnetic tape 41 when all subsequent data is correctly copied from the non-volatile memory 43 to the magnetic tape 41.

On the other hand, when the write of the subsequent data fails (abnormally terminates) for any reason, the tape drive device 1 updates the information about the EOD of the CM 42, but does not write the EOD mark to the magnetic tape 41. Furthermore, the tape drive device 1 sets the above-mentioned write protect flag in the CM 42, and notifies the tape library device 30 that the copying operation of the subsequent data has failed. Afterwards, the tape drive device 1 outputs the information about an error in the storage medium as a response to the command when it receives a command about the data write to the tape cartridge 2 in which a write protect flag is set in the CM 42. Thus, the host machine 3 recognizes the abnormality as in the case when an error of a storage medium occurs when data is written.

Described next is a practical configuration of the tape library device 30 illustrated in FIG. 3.

The tape library device 30 in the present embodiment includes a plurality of tape drive devices 1 as described above, and further includes a robot mechanism 71, a tape cartridge 72, a CM reader 73, and a library control circuit 74.

The robot mechanism 71 holds the tape cartridge 2, and conveys the tape cartridge 2 between the cartridge cell (not illustrated in the attached drawings) or a magazine cell (not illustrated in the attached drawings) provided for the tape library device 30 and the tape drive device 1.

The tape cartridge 72 drives and controls the robot mechanism 71.

The CM reader 73 reads various types of medium management information held in the CM 42 in the tape cartridge 2.

The library control circuit 74 controls the operation of each component configuring the tape library device 30. To be more practical, the library control circuit 74 performs the issue of control to the tape cartridge 72, the data communication with the tape drive device 1, the data communication with the host machine 3, the management of the medium management information read by the CM reader 73 from the CM 42 of the tape cartridge 2. The library control circuit 74 provides a communication interface corresponding to the host interface circuit 54 for data communication with the host machine 3 according to the present embodiment. The data communication between the host machine 3 and the tape library device 30 may be performed through the robot interface circuit 53 of the tape drive device 1 instead of a connection between them by the above-mentioned communication interface.

Furthermore, the library control circuit 74 has the following functions to copy the above-mentioned subsequent data from the non-volatile memory 43 in the tape cartridge 2 to the magnetic tape 41 using an available device (which is not being used, which is in an offline state as viewed from the host machine 3, or on which the tape cartridge 2 is not mounted) in the tape drive devices 1.

First, the library control circuit 74 grasps the number of tape drive devices 1 loaded into the tape library device 30 and the number of the tape drive devices 1 used by the host machine 3.

Furthermore, the library control circuit 74 sets the operations of the process of copying the subsequent data in the available drive (which is not being used, which is in an offline state as viewed from the host machine 3, or on which the tape cartridge 2 is not mounted in the tape drive devices 1). As an example of the operation setting, there is a setting that when a command (for example a move instruction, a road instruction, an unload instruction, etc.) about the conveyance of the tape cartridge 2 is not received from the host machine 3, it is determined that the tape drive device 1 is an available drive, and performs the copying process. Another setting example is to perform the copying process in an operation blank time by setting an operation blank time for each of the tape drive devices 1 when the blank time of the loaded tape drive device 1 is clearly known in the operation period of the tape library device 30 to be used.

The tape library device 30 in FIG. 3 is configured as described above, and the following operations are performed in the present embodiment.

First, at an unmount instruction of the tape cartridge 2 loaded into the tape drive device 1 at an instruction from the host machine 3, the tape drive device 1 performs the process of ejecting the tape cartridge 2. In this case, the tape library device 30 conveys the tape cartridge 2 using the robot mechanism 71.

When the robot mechanism 71 conveys the tape cartridge 2, the information held in the CM 42 of the tape cartridge 2 is accessed to read the save flag information.

When the read save flag information indicates that the subsequent data is written to the non-volatile memory 43, the tape cartridge 2 is mounted on the available drive. After the available drive copies the subsequent data, the tape cartridge 2 is unmounted from the available drive, and accommodated in a specified cartridge cell. The setting of the selection of whether or not the available drive is allowed to perform the operation of copying the subsequent data to the tape cartridge 2 is made on the tape library device 30. When the selection of the copying operation using an available drive, or when there is no available drive, the copying operation is performed in an operation blank time using the tape drive device 1 on which the tape cartridge 2 has been mounted.

Described next is various types of controlling processes performed by the tape drive device 1 illustrated in FIG. 3.

Figure 4:
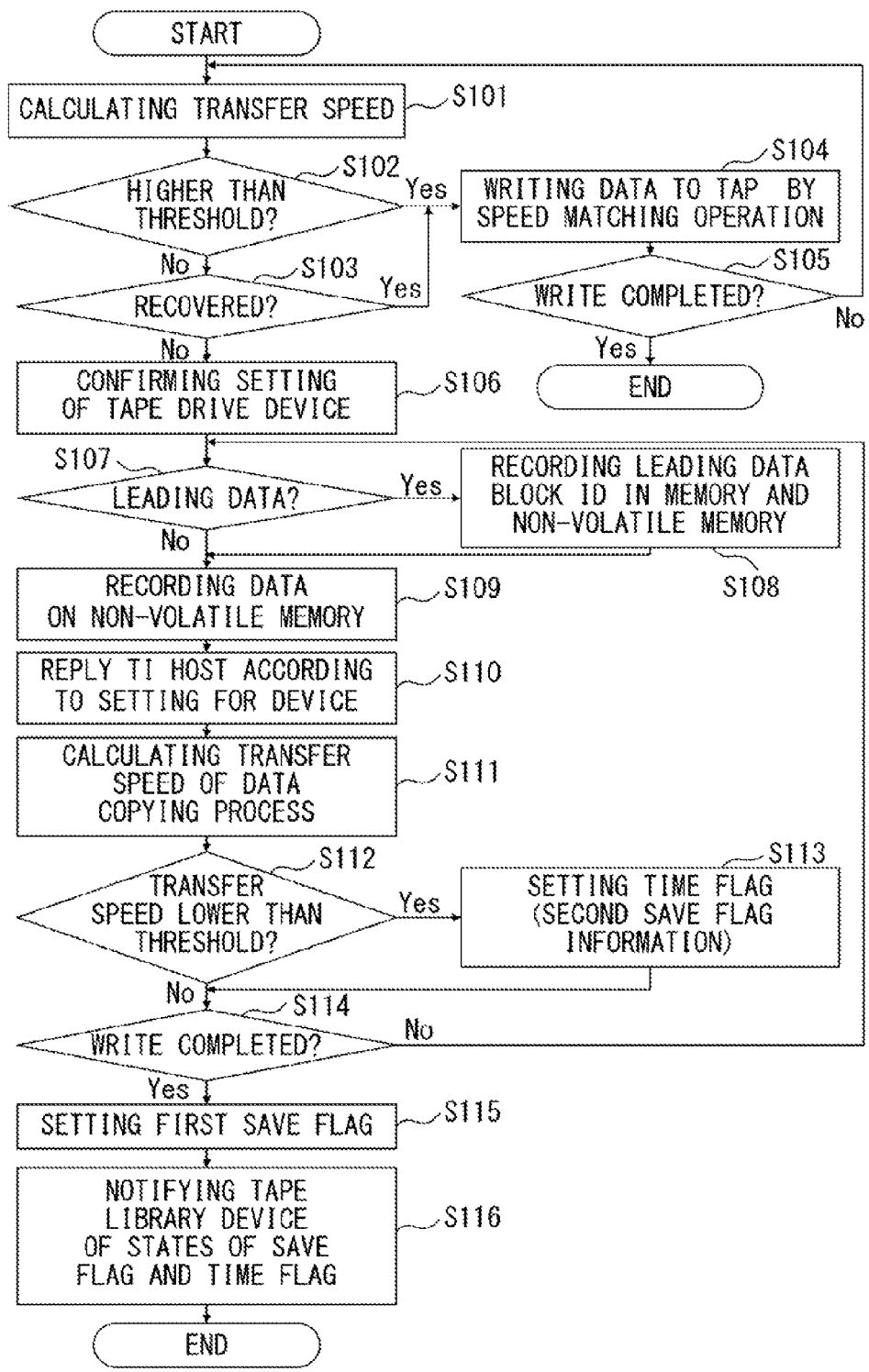
FIG. 4 is a flowchart of the contents of a subsequent data saving process.

The flowchart in FIG. 4 is described first below. FIG. 4 is a flowchart of the contents of a subsequent data saving process. The process is to switch writing the data transmitted from the host machine 3 to the magnetic tape 41 in the tape cartridge 2 to the non-volatile memory 43 in a specified case.

The process in FIG. 4 is performed basically by the MPU 51 controlling the formatter circuit 56. Upon receipt of a specified instruction from the MPU 51 in each process step, the formatter circuit 56 performs various processes indicated in each process step.

Generally, in the process performed through the MPU desires the time relating to the microprogram (firmware) process. To perform the process at a higher speed, it is known to perform the entire process by hardware (the formatter circuit 56 in this case). However, in the description of the present embodiment, the formatter circuit 56 performs each process at an instruction of the MPU 51.

First, in S101, the transfer speed of the data held in the tape cartridge 2 to the tape cartridge 2 is calculated by the formatter circuit 56 based on the feature value of the data.

In the calculation of the transfer speed, at least one of the block size of the data transmitted from the host machine 3, the amount of transmitted data (file size), and the index indicating the continuity of the transmitted data is used. Among them, the index indicating the continuity of the transmitted data is calculated by, for example, obtaining the ratio of the time in which the amount of data received per unit time exceeds a specified threshold to a specified time. For example, in the entire time of the specified time, when the amount of data received per unit time exceeds the specified threshold, the calculated value is the maximum value (1.0). In addition, the longer the time in which the amount of data received per unit time falls short of the specified threshold, the smaller the value thus calculated.

Next, in S102, the formatter circuit 56 compares the transfer speed calculated in the process in S101 with a specified threshold speed, and determines whether or not the transfer speed equals or exceeds the threshold speed. When the formatter circuit 56 determines that the transfer speed equals or exceeds the threshold speed (when the determination result is YES), control is passed to S104. If it determines that the transfer speed is lower than the threshold speed (when the determination result is NO), control is passed to S103.

According to the present embodiment, the threshold speed is set as the speed (for example, transfer speed of 30-40% of the maximum transfer function (when data is uncompressed) of the tape drive device 1) which is be handled by the speed matching function.

Next, in S103, after a standby for a specified time during the progress of the process, the formatter circuit 56 performs a determining process similar to the process in S102, and determines whether or not the transfer speed has been recovered to the threshold speed or higher by the standby. When the formatter circuit 56 determines that the transfer speed has recovered to the threshold speed or higher (when the determination result is YES), control is passed to S104. When it determines that the transfer speed still falls short of the threshold speed (determination result is NO), control is passed to S106.

The reduction of the transfer speed calculated in the process in S101 may be regarded as a temporary event. In this case, it may be preferable from the viewpoint of writing subsequent data performed later to use the speed matching function rather than to save the subsequent data in the non-volatile memory 43. Then, according to the present embodiment, it is determined in the determining process in S103 after S102 whether or not the reduction of the transfer speed is a temporary event. When it is determined that the reduction is a temporary event, it is handled by the speed matching function in the process in S104 described later.

In S104, the formatter circuit 56 writes the data transmitted from the host machine 3 to the magnetic tape 41 in the tape cartridge 2 using the above-mentioned speed matching function.

In S105, the formatter circuit 56 determines whether or not all data transmitted from the host machine 3 has been written to the magnetic tape 41. If the formatter circuit 56 determines that all the data has been written to the magnetic tape 41 (when the determination result is YES), the writing process to the magnetic tape terminates.

On the other hand, when the formatter circuit 56 determines that data is continuously transmitted from the host machine 3, and the data write has not been completed (when the determination result is NO), control is returned to S101, and the above-mentioned process is performed again.

The subsequent processes from S106 to S115 are to switch the write destination of the data transmitted from the host machine 3 to the non-volatile memory 43, and write the subsequent data to the non-volatile memory 43.

First, in S106, the formatter circuit 56 confirms the contents of the setting on the responsivity to the host machine 3 preset for the tape drive device 1. The contents of the setting confirmed by the process relates to a setting as to whether or not the reply to the host machine 3 in response to the write instruction of the data transmitted from the host machine 3 is to be delayed when the data write is performed on the non-volatile memory 43.

Next, in S107, the formatter circuit 56 determines whether or not the data (subsequent data) written to the non-volatile memory 43 in the process in S109 performed immediately after S107 is the leading data immediately after the write destination is switched from the magnetic tape 41 to the non-volatile memory 43. The formatter circuit 56 passes control to S108 when it is determined that the subsequent data to be written is the leading data (when the determination result is YES). On the other hand, when it is determined that the subsequent data to be written is not the leading data (when the determination result is NO), control is passed to S109.

In S108, the formatter circuit 56 stores the ID information (identification information) for designation of the leading data block of the subsequent data in the memory 52 through the MPU 51, and records the information also in the CM 42 in the tape cartridge 2 through the CM drive control circuit 61. The ID information is an example of the information about the position on the data transmitted from the host machine 3. The memory 52 which stores the ID information has the function corresponding to the subsequent data position identification storage unit 16 in FIG. 1. The formatter circuit 56 for performing the process in S108 and storing the ID information in the CM 42 provides the function corresponding to the management information storage control unit 20 in FIG. 1.

Next, in S109, the formatter circuit 56 writes the subsequent data transmitted from the host machine 3 to the non-volatile memory 43 in the tape cartridge 2.

Next, in S110, the formatter circuit 56 controls the host interface circuit 54 according to the setting confirmed by the process in S106, and transmits to the host machine 3 the reply information that the data has been written to the tape cartridge 2. In this case, if it has been confirmed that the setting of delaying the reply to the host machine 3 has been made, then the formatter circuit 56 performs the control for transmission of the reply information to be performed by the host interface circuit 54 after the delay for a specified time. According to the present embodiment, the time delay for the control is set as long as the time desired issuing a reply when data is written to the magnetic tape 41 at the lower limit of the speed matching function.

The formatter circuit 56 which delays for a specified time the control for transmission of the reply information to be performed by the host interface circuit 54 by performing the process in S110 provides the function corresponding to the delay unit 15 in FIG. 1. The host interface circuit 54 which transmits the reply information provides the function corresponding to the reply information transmission unit 14 in FIG. 1.

Next, in S111, the formatter circuit 56 calculates the transfer speed estimated when the subsequent data written to the non-volatile memory 43 at this time point is copied to the magnetic tape 41. The calculation of the transfer speed is performed in the method as in the process in S101 based on the feature value on the subsequent data.

Next, in S112, the formatter circuit 56 determines whether or not the transfer speed calculated in the process in S111 reaches the threshold speed. If it determines that the transfer speed does not reach the threshold speed (when the determination result is YES), control is passed to S113. If it determines that the transfer speed equals or exceeds the threshold speed (when the determination result is NO), control is passed to S114.

In S113, the formatter circuit 56 sets a time flag (above-mentioned second save flag information) in the CM 42 in the tape cartridge 2. The state in which the time flag is set (for example, even using the speed matching function) indicates that a time longer than a normal case is desired to copy subsequent data. The formatter circuit 56 which sets the time flag in the CM 42 by performing the process in S113 provides the function corresponding to the management information storage control unit 20 in FIG. 1.

Next, in S114, the formatter circuit 56 determines whether or not the subsequent data has been completely written to the non-volatile memory 43. The determination of the completion of the write of the subsequent data is performed depending on whether or not an unload instruction from the host machine 3 (unload instruction to the tape drive device 1) has been received. The determination is also performed by, for example, detecting the write of the subsequent data up to the full storage capacity of the non-volatile memory 43.

When the formatter circuit 56 determines in the determining process in S114 that the write of the subsequent data to the non-volatile memory 43 has been completed (the determination result is YES), control is passed to S115. On the other hand, when the formatter circuit 56 determines that the write of the subsequent data to the non-volatile memory 43 has not been completed (the determination result is NO), control is returned to S107, and the process of writing the subsequent data is repeated.

The formatter circuit 56 which performs the processes in S101 through S114 provides the function corresponding to the data write unit 13 in FIG. 1.

In S115, the formatter circuit 56 sets the save flag (the above-mentioned first save flag information) indicating that the subsequent data has been written to and saved in the non-volatile memory 43 in the CM 42 in the tape cartridge 2.

In S116, the formatter circuit 56 notifies the library control circuit 74 of the tape library device 30 of the state of the time flag and the save flag about the tape cartridge 2 mounted on the tape drive device 1. Upon completion of the process, the subsequent data saving process in FIG. 4 terminates.

The process described above is the subsequent data saving process.

In the description above, it is assumed that the data transmitted from the host machine 3 is written as is to the magnetic tape 41 and the non-volatile memory 43 in the tape cartridge 2. Instead, the formatter circuit 56 may perform the data compressing process on the data transmitted from the host machine 3 and write the compressed data to the magnetic tape 41 and the non-volatile memory 43.

Furthermore, during the progress of the process in FIG. 4, when the write of the subsequent data to the non-volatile memory 43 abnormally terminates due to the fault of the circuit etc., the tape drive device 1 may, for example, perform the process of a medium error. By reporting such an error, the host machine 3 recognizes that the medium error has occurred during the data write to the tape cartridge 2 as in the conventional method. Therefore, by the recognition, the host machine 3 uses (operates) memory without considering the non-volatile memory 43 such as rewriting data using another tape cartridge 2 etc.

The flowchart in FIG. 5 is described below. FIG. 5 is a flowchart of the contents of a saved data reading process. The process is to read data from the tape cartridge 2 in which the subsequent data is saved in the non-volatile memory 43 (the subsequent data writing process has not been performed yet) as a result of the subsequent data saving process in FIG. 4 in the tape drive device 1.

The process in FIG. 5 is performed by the MPU 51 controlling the formatter circuit 56, and the formatter circuit 56 performs various processes indicated by the respective process steps upon receipt of a specified instruction from the MPU 51 in each process step.

The process performed through the MPU desires the time taken to perform the microprogram (firmware) processing. Although it is known that hardware (the formatter circuit 56 in this case) performs the entire process at a higher speed, the formatter circuit 56 performs each process at an instruction of the MPU 51 for convenience according to the present embodiment.

The process in FIG. 5 is started when the information about the reception of the access to the data held in the tape cartridge 2 is detected. The host interface circuit 54 which receives the access provides the function corresponding to the access reception unit 17 in FIG. 1.

In FIG. 5, first in S201, the formatter circuit 56 confirms from access received from the host machine 3 the ID information (identification information) about the logical block of the data which is included in the access, and for which a read is requested.

Next, in S202, the formatter circuit 56 determines from the ID information acquired in the process in S201 whether or not the data to be accessed is held in the magnetic tape 41 or in the non-volatile memory 43. In the determining process, the leading ID information of the subsequent data stored in the memory 52 in the process in S108 in FIG. 4 is referenced first. Then, it is determined whether or not the position of the data designated by the ID information acquired in the process in S201 precedes the position designated by the leading ID information of the subsequent data. If the ID information acquired in the process in S201 relates to the data at the position preceding the header of the subsequent data, then it is determined that the data to be accessed is held in the magnetic tape 41, and control is passed to S203. On the other hand, is the ID information acquired in the process in S201 relates to the data at the position at or after the header of the subsequent data, then it is determined that the data to be accessed is held in the non-volatile memory 43, and control is passed to S205.

The formatter circuit 56 which performs the determining process in S202 provides the function corresponding to the access destination determination unit 18 in FIG. 1.

In S203, The formatter circuit 56 reads the data designated by the ID information acquired in the process in S201 from the magnetic tape 41, controls the host interface circuit 54, and transmits the read data to the host machine 3.

Next, in S204, the formatter circuit 56 determines whether or not all data to be accessed has been completely read. The formatter circuit 56 terminates the saved data reading process in FIG. 5 when all data to be accessed has been completely read (when the determination result is YES). On the other hand, if the formatter circuit 56 determines that all data to be accessed has not been completely read (if the determination result is NO), then control is returned to S201, and the process for reading the data to be accessed is continued.

Next, in S205, the formatter circuit 56 confirms the contents of the setting about the responsivity to the host machine 3 which are preset in the tape drive device 1. The contents of the setting confirmed by the process relates to a setting as to whether or not the reply to the host machine 3 in response to the write instruction of the data transmitted from the host machine 3 is to be delayed when the data read is performed on the non-volatile memory 43.

In S206, the formatter circuit 56 reads the data designated by the ID information acquired in the process in S201 from the non-volatile memory 43.

In S207, the formatter circuit 56 issues a reply by transmitting the data read from the non-volatile memory 43 to the host machine 3 after controlling the host interface circuit 54 according to the setting for which the confirmation is made in the process in S205. In this case, if it has been confirmed that the setting of delaying the reply to the host machine 3 has been made, then the formatter circuit 56 performs the control for transmission of the data to be performed by the host interface circuit 54 after the delay for a specified time. According to the present embodiment, the time delay for the control is set as long as the time used issuing a reply when data is written to the magnetic tape 41 at the lower limit of the speed matching function.

Next, in S208, the formatter circuit 56 determines whether or not all data to be accessed has been completely read. If the formatter circuit 56 determines that all data to be accessed has been completely read (if the determination result is YES), then the saved data reading process in FIG. 5 is terminated. On the other hand, if the formatter circuit 56 determines that all data to be accessed has not been completely read (if the determination result is NO), then control is returned to step S206, and the process for reading the data to be accessed is continued.

The formatter circuit 56 for performing the processes in S201 through S208 provides the function corresponding to the data read unit 19 in FIG. 1.

Described above is the saved data reading process.

During the progress of the process in FIG. 5, if the data read from the non-volatile memory 43 has been abnormally terminated due to the fault of a circuit etc., then the tape drive device 1 may, for example, perform a process for a medium error. By issuing such a error report, the host machine 3 uses (operates) memory without considering the non-volatile memory 43 such as recognizing an occurrence of a medium error in reading data from the tape cartridge 2 as in the prior art and repeating the reading process etc.

Described next is the operation of copying the subsequent data from the non-volatile memory 43 to the magnetic tape 41 in the tape cartridge 2 which is performed in the tape library device 30 in FIG. 3.

The tape library device 30 copies data from the non-volatile memory 43 to the magnetic tape 41 on the tape drive device 1 when the unmount instruction is received from the host machine 3. The operation of copying performed according to the instruction depends on the setting state of the save flag and the time flag, the number of loaded tape drive devices 1 in the tape library device 30, the presence/absence of an available drive in the devices, etc.

As described above, in copying the subsequent data from the non-volatile memory 43 to the magnetic tape 41, when the subsequent data is small in block size and file size, the operation of the tape is frequently activated and stopped. Therefore, in this case, the data transfer performance is low while the time used to perform the process becomes longer. Therefore, the tape library device 30 basically copies using an available drive the subsequent data about the tape cartridge 2 in which the flag indicating that the data has been saved, that is, the above-mentioned time flag, is set.

Figure 6:
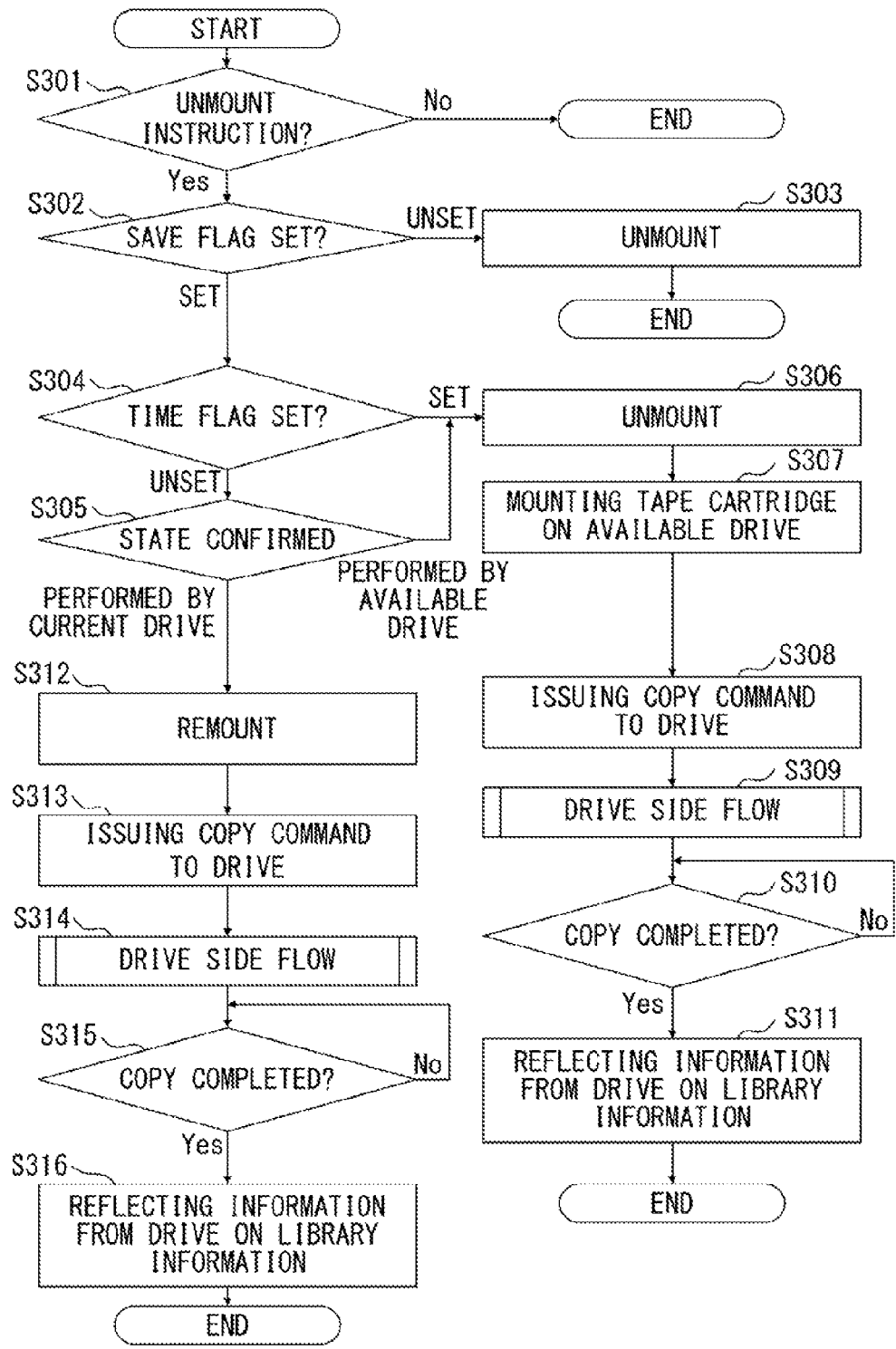
FIG. 6 is a flowchart of the contents of a library side subsequent data write controlling process.

Described below is the flowchart in FIG. 6. FIG. 6 is a flowchart of the contents of the library side subsequent data write controlling process. The library control circuit 74 of the tape library device 30 performs the process to allow the tape library device 30 to perform the operation of copying the subsequent data.

The process in FIG. 6 is started each time the library control circuit 74 receives various instructions transmitted from the host machine 3.

In FIG. 6, first in S301, the library control circuit 74 performs the process of determining whether or not the instruction received from the host machine 3 is an unmount (eject) instruction. When the library control circuit 74 determines that the received instruction is an unmount instruction (when the determination result is YES), control is passed to step S302. On the other hand, when the library control circuit 74 determines that the received instruction is not an unmount instruction (when the determination result is NO), the process in FIG. 6 is terminated, and the process is started depending on the received instruction. The library control circuit 74 which performs the determining process in S301 provides the function corresponding to the tape library device control unit 31.

Next, in S302, the library control circuit 74 determines whether or not the save flag set by performing the process in S115 in FIG. 4 is set in the CM 42 of the tape cartridge 2 for which the unmount instruction is issued. It is assumed that the read of the save flag information from the CM 42 ejects the tape cartridge 2 when control is passed from S301 to S302, allows the robot mechanism 71 to hold the tape cartridge 2, and reads the CM 42 in the tape cartridge 2 by the CM reader 73. It is obvious that the CM information recorded in the memory 52 of the tape drive device 1 is read and determined with the tape cartridge 2 held in the tape drive device tape drive device 1. The library control circuit 74 passes control to S304 when it is determined that the save flag is set (when the determination result is YES). On the other hand, when the library control circuit 74 determines that the save flag is not set and the subsequent data is not saved in the non-volatile memory 43 (when the determination result is NO), it passes control to S303.

In S303, the library control circuit 74 issues a specified instruction to the tape cartridge 72 to perform the unmounting process up to the completion of the conveyance to a specified magazine cell. However, as described above, when the tape cartridge 2 is in the tape drive device 1, the robot mechanism 71 performs a series of unmounting operations of issuing a specified instruction to the tape drive device 1 and the tape cartridge 72, ejecting the tape cartridge 2 from the tape drive device 1, drawing the tape cartridge 2 from the tape drive device 1, and completing the conveyance to a specified magazine cell. Afterwards, the process in FIG. 6 is terminated.

In S304, the library control circuit 74 determines whether or not a time flag (above-mentioned second save flag information) set by performing the process in S113 in FIG. 4 is set in the CM 42 of the tape cartridge 2 for which the unmount instruction is issued. As described above, the read of the save flag information from the CM 42 ejects the tape cartridge 2 when control is passed from S301 to S302, holds the tape cartridge 2 in the robot mechanism 71, and has read the CM 42 by the CM reader 73. It is obvious that the CM information recorded in the memory 52 of the tape drive device 1 is read and determined with the tape cartridge 2 held in the tape drive device tape drive device 1. The library control circuit 74 passes control to S306 when it is determined that the time flag is set, and a longer time than a normal time period is desired to copy the subsequent data (when the determination result is YES). On the other hand, when the library control circuit 74 determines that the save flag is not set and the time desired to copy the subsequent data is estimated as long as a normal time period (when the determination result is NO), it passes control to S305. The library control circuit 74 which performs the determining process in S304 provides the functions of the tape drive device control unit 32, the copy determination information unit 37, the save flag determination unit 36, and the tape library device control unit 31 in FIG. 2.

In S305, the library control circuit 74 confirms various current states of the tape library device 30, and selects the tape drive device 1 for copying the subsequent data depending on the states. When the library control circuit 74 determines that the process of copying the subsequent data is to be performed by an available drive (which is not being used in a plurality of tape drive devices 1 provided for the tape library device 30), control is passed to S306. On the other hand, when the library control circuit 74 determines that the subsequent data is to be copied by the current tape drive device 1 being mounted at this time point, control is passed to S312. When the current tape drive device 1 is used, and if the save flag information is read from the tape cartridge 2, the tape cartridge 2 is in the robot mechanism 71. Therefore, it is needed to remount the tape cartridge 2 to the current tape drive device 1, but if the save flag information is read from the tape drive device 1, the tape cartridge 2 is in the tape drive device 1, thereby not requiring the remounting operation.

The state of the tape library device 30 confirmed by the process is the number of the tape drive devices 1 provided for the tape library device 30, the use state of each tape drive device 1, etc. For example, when copying the subsequent data constantly in an available drive is preset in the tape library device 30, the library control circuit 74 determines that the process of copying the subsequent data is performed by an available drive. In addition, for example, when an available drive exists in the tape library device 30, and if it is estimated that a long time is desired to copy the subsequent data, then the library control circuit 74 determines that the process of copying the subsequent data is to be performed by the available drive. On the other hand, for example, when none of the tape drive devices 1 provided in the tape library device 30 can be used because they are all in service etc., the library control circuit 74 determines that the process of copying the subsequent data is performed by the tape drive device 1. In addition, for example, if only one tape drive device 1 is provided for the tape library device 30, the library control circuit 74 determines that the process of copying the subsequent data is to be performed by the current tape drive device 1.

The process of copying subsequent data in the processes in and after S306 through S311 is performed by an available drive.

First, In S306, the library control circuit 74 issues a specified instruction to the tape cartridge 72 to perform the unmounting process up to the completion of the conveyance to a specified magazine cell. However, as described above, when the tape cartridge 2 is in the tape drive device 1, the robot mechanism 71 performs a series of unmounting operations of issuing a specified instruction to the tape drive device 1 and the tape cartridge 72, ejecting the tape cartridge 2 from the tape drive device 1, drawing the tape cartridge 2 from the tape drive device 1, and completing the conveyance to a specified magazine cell.

Next, in S307, the library control circuit 74 issues a specified instruction to the tape cartridge 72 to perform a series of mounting operations of inserting the tape cartridge 2 conveyed to the position of the available drive into the available drive in S306, and issuing an instruction to perform a loading operation to the available drive.

The robot mechanism 71 which performs the processes of unmounting and mounting the tape cartridge 2 in the processes in S306 and S307 above provides the functions corresponding to the tape drive device control unit 32, the tape library device control unit 31, the robot control unit 34, and the robot unit 33 in FIG. 2.

In S308, the library control circuit 74 issues a specified copy command to instruct the tape drive device 1 on which the tape cartridge 2 is mounted to perform the process of copying the subsequent data. Then, in S309, the tape drive device 1 which has received the copy command performs the process of copying the subsequent data. The details of the copying process are described later.

The library control circuit 74 which performs the process in S308 provides the function corresponding to the tape drive device control unit 32 in FIG. 2.

Next, in S310, the library control circuit 74 determines whether or not a specified notification of the completion of the copying process has been received from the tape drive device 1.

Next, in S311, the library control circuit 74 updates the medium management information (library information) about the tape cartridge 2 of the library control circuit 74, and reflects the information that the copying process has been completed on the tape cartridge 2. Upon completion of the process, the process in FIG. 6 terminates.

The process of copying the subsequent data in the subsequent processes in and S312 through S316 is performed by the current drive.

First, in S312, the tape cartridge 2 in the robot mechanism 71 is remounted on the tape drive device 1.

Next, in S313, the library control circuit 74 issues a specified copy command to instruct the current tape drive device 1 on which the tape cartridge 2 is mounted to perform the process of copying the subsequent data. Then, in S314, the tape drive device 1 which has received the copy command performs the process of copying the subsequent data. The details of the copying process are described later.

Next, in S315, the library control circuit 74 determines whether or not the specified notification of the completion of the copying process has been received from the tape drive device 1.

Next, in S316, the library control circuit 74 updates the management information (library information) about the tape cartridge 2 of the library control circuit 74, and reflects that the copying process about the tape cartridge 2 has been completed. When the process is completed, the process in FIG. 6 terminates.

The processes described above are the library side subsequent data write controlling process. After completion of the process, the library control circuit 74 issues an instruction to instruct the tape drive device 1 to unload the tape cartridge 2, and conveys the tape cartridge 2 to the cartridge cell for storage.

The process of copying the subsequent data by the current drive, which is the processes in S313 through S316 in FIG. 6, may be performed, for example, using an available time in which no other processes performed by the current drive are performed. In this case, the available time for the current drive may be detected, for example, as follows.

First, when the operation time of the current drive can be set on the tape library device 30, the process of copying the subsequent data is performed using the time other than the set operation time.

When the time interval for issuing various instructions to the current drive is determined in advance, the process of copying the subsequent data on the current drive is to be performed in the time available between the time intervals for issuing the instructions.

Described below is the flowchart in FIG. 7. FIG. 7 is a flowchart of the contents of a drive side subsequent data write controlling process as the processes in S309 through S314 in FIG. 6. The process is to perform the operation of copying the subsequent data by the tape drive device 1.

The process in FIG. 7 is performed by the MPU 51 controlling the formatter circuit 56. Upon receipt of a specified instruction from the MPU 51 in each process step, the formatter circuit 56 performs various processes indicated by each process step.

First, in S401, when the processes in S308 and S313 in FIG. 6 are performed, the load command process is performed again on the tape drive device 1 through the robot interface circuit 53 and the MPU 51. In this case, it is assumed that the tape drive device 1 may perform the copying process.

Next, in S402, the formatter circuit 56 receives the copy command transmitted from the tape library device 30 through the robot interface circuit 53 and the MPU 51. Then, in the subsequent S403, the formatter circuit 56 moves the magnetic tape 41 to the trailing position (where the EOD mark is applied) where data is recorded.

Next, in S404, the formatter circuit 56 reads the subsequent data held in the non-volatile memory 43 in the tape cartridge 2, and copies the subsequent data after the data already held on the magnetic tape 4. The formatter circuit 56 which performs the process provides the function corresponding to the subsequent data copy unit 22 in FIG. 1.

Next, in S405, the formatter circuit 56 determines whether or not the subsequent data held in the non-volatile memory 43 has been completely copied. When he formatter circuit 56 determines that the copying process has been completed (the determination result is YES), it passes control to S406. On the other hand, if the formatter circuit 56 determines that the copying process has not been completed (the determination result is NO), control is returned to S404, and the copying process is continued.

Next, in S406, the formatter circuit 56 determines whether or not the operation of copying the subsequent data to the magnetic tape 41 has been normally terminated. In this case, if the formatter circuit 56 determines that the copying operation has been normally terminated (determination result is YES), the formatter circuit 56 passes control to S407. On the other hand, if the formatter circuit 56 determines that the copying operation has been abnormally terminated for any reason (determination result is NO), control is passed to S408. The formatter circuit 56 for performing the determining process provides the function corresponding to the normal termination determination unit 23 in FIG. 1.

In S407, the formatter circuit 56 writes the EOD mark at the trailing position of the copied subsequent data on the magnetic tape 41. In the subsequent S408, the formatter circuit 56 updates the information about the EOD held in the CM 42 of the tape cartridge 2.

Next, in S409, the formatter circuit 56 reports to the tape library device 30 that the process of copying the subsequent data on the tape cartridge 2 has been normally terminated. Upon receipt of the report, the tape library device 30 updates the library information about the tape cartridge 2 in the process in S311 or S316 in FIG. 6, and the library control circuit 74 reflects the normally completed copying process.

Next, in S410, since the operation of copying the subsequent data to the magnetic tape 41 has been normally terminated, the formatter circuit 56 discards the subsequent data held in the non-volatile memory 43 in the tape cartridge 2, and then the process in FIG. 7 is terminated. The formatter circuit 56 which performs the process provides the function corresponding to the subsequent data discard unit 24 in FIG. 1.

In S412, the formatter circuit 56 updates the information about the EOD held in the CM 42 of the tape cartridge 2.

Next, in S413, the formatter circuit 56 reports to the tape library device 30 that the process of copying the subsequent data in the tape cartridge 2 has been abnormally terminated. Upon receipt of the report, the library control circuit 74 in the tape library device 30 updates the library information about the tape cartridge 2 in the process in S311 or S316 in FIG. 6, and reflects that the copying process has been abnormally terminated.

After terminating the process in S413, the process in FIG. 7 terminates. Therefore, when the process of copying the subsequent data in the tape cartridge 2 has been abnormally terminated, the subsequent data held in the non-volatile memory 43 is not discarded and is continuously held as is.

The processes above are the drive side subsequent data write controlling process.

In the process in S412 in FIG. 7, the formatter circuit 56 may further set in the CM 42 a flag indicating that data is write-disabled in the tape cartridge 2. In this case, upon receipt of a data write request to the tape cartridge 2 in which the flag is set in the CM 42, the tape drive device 1 returns to the host machine 3, for example, the information about the occurrence of a medium error. Thus, the host machine 3 recognizes that any problem has occurred in the tape cartridge 2.

If a data access request is received from the host machine 3 during the progress of the process of copying the above-mentioned subsequent data, the tape library device 30 or the tape drive device 1 may return the information that another process being performed.

The tape library device 30 in FIG. 3 operates as described above, and the tape drive device 1 writes the subsequent data to the non-volatile memory 43 provided in the tape cartridge 2 as described above. Therefore, the write and read of a small volume of data in block size and file size, which are not sufficiently performed by the tape drive device in the LTO standard, is performed at a high transfer speed.

In addition, the tape drive device 1 holds the ID information for designation of the leading data block of the subsequent data saved in the non-volatile memory 43. Therefore, even before copying the subsequent data from the non-volatile memory 43 to the magnetic tape 41, the data held by the tape cartridge 2 is accessed.

Furthermore, the tape library device 30 uses the available drive provided for the tape library device 30 to perform the process of copying the subsequent data from the non-volatile memory 43 to the magnetic tape 41. Therefore, even the subsequent data estimated to desire some time for the copying process is hidden from the performance of the copying process as viewed from the host machine 3. Therefore, the degradation of the performance of the tape library device 30 caused by the copying process as viewed from the host machine 3 is avoided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A tape drive device for storing data in a tape cartridge which includes a magnetic tape and non-volatile semiconductor memory, the tape drive device comprising:
    a comparison unit that compares a transfer speed of data transmitted from a host machine to the tape drive device with a speed threshold;
    a speed determination unit that determines a writing speed to a tape cartridge using the speed threshold; and
    a data write unit that writes data to the tape cartridge, the data write unit writing data to the magnetic tape provided for the tape cartridge when the determined writing speed is equal to or higher than the speed threshold, and the data write unit writing subsequent data following data written to the magnetic tape to the non-volatile semiconductor memory provided for the tape cartridge when the determined writing speed is lower than the speed threshold.

2. The tape drive device according to claim 1, wherein the comparison unit detects the transfer speed compared to the speed threshold using at least one of a block size of data transmitted from the host machine to the tape drive device, an amount of the data, and an index indicating continuity of the data.

3. The tape drive device according to claim 1, further comprising:
    a reply information transmission unit that transmits reply information, which indicates that the data write unit has written data to the tape cartridge, to a transmitter of data to the tape drive device; and
    a delay unit that delays a transmission of the reply information by the reply information transmission unit when the data write unit writes the subsequent data to the non-volatile semiconductor memory of the tape cartridge.

4. The tape drive device according to claim 1, further comprising
    a subsequent data position information storage unit that stores subsequent data position information indicating a position of the subsequent data on the data written to the tape cartridge.

5. The tape drive device according to claim 4, further comprising:
    an access reception unit that receives access to data to the tape drive device;
    an access destination determination unit that determines according to the subsequent data position information stored in the subsequent data position information storage unit whether access received by the access reception unit is made to data written to the magnetic tape provided for the tape cartridge, or to the subsequent data written to the non-volatile semiconductor memory provided for the tape cartridge; and
    a data write unit that reads data for the access received by the access reception unit from one of the magnetic tape and the non-volatile semiconductor memory selected based on a determination result by the access destination determination unit, and the data write unit outputting the data to an access source of the access.

6. The tape drive device according to claim 5, wherein when the data read unit reads data for the access received by the access reception unit from the non-volatile semiconductor memory, the data read unit delays the read data and outputs the delayed data to the access source.

7. The tape drive device according to claim 4, wherein:
    a management information storage unit that stores management information about contents of stored data in the tape cartridge is further included in the tape cartridge;
    the tape drive device further comprises a management information storage control unit that allows the management information storage unit provided for the tape cartridge to store the management information; and
    when the data write unit writes the subsequent data to the non-volatile semiconductor memory provided for the tape cartridge, the management information storage control unit allows the management information storage unit provided for the tape cartridge to store the subsequent data position information about the written subsequent data.

8. The tape drive device according to claim 7, wherein the management information storage control unit sets a flag in the management information storage unit when an estimated value of the transfer speed of the data from the non-volatile semiconductor memory to the magnetic tape of the tape cartridge falls short of the speed threshold.

9. The tape drive device according to claim 1, further comprising
    a subsequent data copy unit that reads the subsequent data from the non-volatile semiconductor memory provided for the tape cartridge according to a specified instruction, and the subsequent data copy unit copying to a magnetic tape provided for the tape cartridge the read subsequent data following data already written to the magnetic tape.

10. The tape drive device according to claim 9, further comprising:

a normal termination determination unit that determines whether or not a copying operation of the subsequent data to the magnetic tape by the subsequent data copy unit has normally terminated; and a subsequent data discard unit that discards the subsequent data from the non-volatile semiconductor memory when the normal termination determination unit determines that the copying operation by the subsequent data copy unit has normally terminated.

11. A data storing method of storing data in a tape cartridge in which the tape cartridge has a magnetic tape and non-volatile semiconductor memory, the data storing method comprising:

detecting a transfer speed of data transmitted from a host machine;

comparing the detected transfer speed with a speed threshold; and writing the data to the magnetic tape provided for the tape cartridge when the detected transfer speed is equal to or higher than the speed threshold, and writing subsequent data after data written to the magnetic tape to the non-volatile semiconductor memory provided for the tape cartridge when the detected transfer speed is lower than the speed threshold.

* * * * *